INVENTOR.
DONALD E. ROSENHEIM
BY Paul M Enlow
AGENT

Nov. 3, 1959 D. E. ROSENHEIM 2,911,623

MARKER PULSE CIRCUIT

Filed March 7, 1955 9 Sheets-Sheet 2

INVENTOR.
DONALD E. ROSENHEIM

BY Paul McEnlow

AGENT

Nov. 3, 1959 D. E. ROSENHEIM 2,911,623

MARKER PULSE CIRCUIT

Filed March 7, 1955 9 Sheets-Sheet 3

INVENTOR.
DONALD E. ROSENHEIM

BY Paul McEnlow

AGENT

INVENTOR.
DONALD E. ROSENHEIM
BY Paul McEnlow
AGENT

INVENTOR.
DONALD E. ROSENHEIM
BY Paul M Enlow
AGENT

Nov. 3, 1959 D. E. ROSENHEIM 2,911,623

MARKER PULSE CIRCUIT

Filed March 7, 1955 9 Sheets-Sheet 6

INVENTOR.
DONALD E. ROSENHEIM
BY Paul M Enlow
AGENT

INVENTOR.
DONALD E. ROSENHEIM
BY Paul M Enlow
AGENT

INVENTOR.
DONALD E. ROSENHEIM
BY Paul McEnlow
AGENT

Nov. 3, 1959 D. E. ROSENHEIM 2,911,623

MARKER PULSE CIRCUIT

Filed March 7, 1955 9 Sheets-Sheet 9

INVENTOR.
DONALD E. ROSENHEIM

BY Paul M Enlow

AGENT

United States Patent Office 2,911,623

Patented Nov. 3, 1959

2,911,623

MARKER PULSE CIRCUIT

Donald E. Rosenheim, Long Beach, N.Y., assignor to International Business Machines Corporation, New York, N.Y., a corporation of New York Application March 7, 1955, Serial No. 492,529

17 Claims. (Cl. 340—174)

This invention relates to novel pulse circuits and timing systems having particular application in high speed electronic devices, and more particularly relates to novel circuit means for producing a marker pulse.

A major object of this invention is to provide novel circuit means responsive to pulses read from a moving recording medium which is susceptible to velocity variations so as to provide a timing or marker pulse at a predetermined point between adjacent pulses read from said recording mechanism.

Another object is to provide a novel electrical circuit arrangement capable of doubling the pulse repetition rate of a train of input pulses having a normally fixed repetition rate which is capable of being changed.

A further object is to provide a circuit capable of doubling the maximum repetition rate of pulses obtained from a rotating magnetic drum, where the speed of the drum and thus the repetition rate of said pulses is subject to change due power supply variations, belt wearing, bearing wear and the like.

Another object is to provide a single-cycle multivibrator, the frequency of which is adjustable in accordance with the changing repetition rate of input triggering pulses so as to require the multivibrator to assume each of two stable states during predetermined portions of the period thereof.

Another object is to provide a circuit arrangement for delaying voltage pulses a predetermined portion of the time interval existing between adjacent input pulses which are capable of having a changeable repetition rate.

Another object is to provide means for multiplying the repetition rate of a train of input pulses having a changeable repetition rate.

Another object is to provide mid-time marker pulses which occur midway between adjacent input pulses having a changeable repetition frequency.

A further object is to provide a novel circuit arrangement responsive to a train of input voltage pulses having a changeable repetition rate or period to produce an output pulse at a preselected point between adjacent input pulses.

A still further object is to provide a novel circuit arrangement which produces output pulses having a predetermined duty cycle in response to input pulses of a changeable repetition rate.

It is also an object of this invention to provide a single-cycle multrivibrator having a pre-adjusted duty cycle, and novel circuit means for thereafter regulating the duty cycle to said pre-adjusted value.

Other objects of the invention will be pointed out in the following description and claims and illustrated in the accompanying drawings, which disclose, by way of example, the principle of the invention and the best mode, which has been contemplated, of applying that principle.

Figures 2A, 2C:
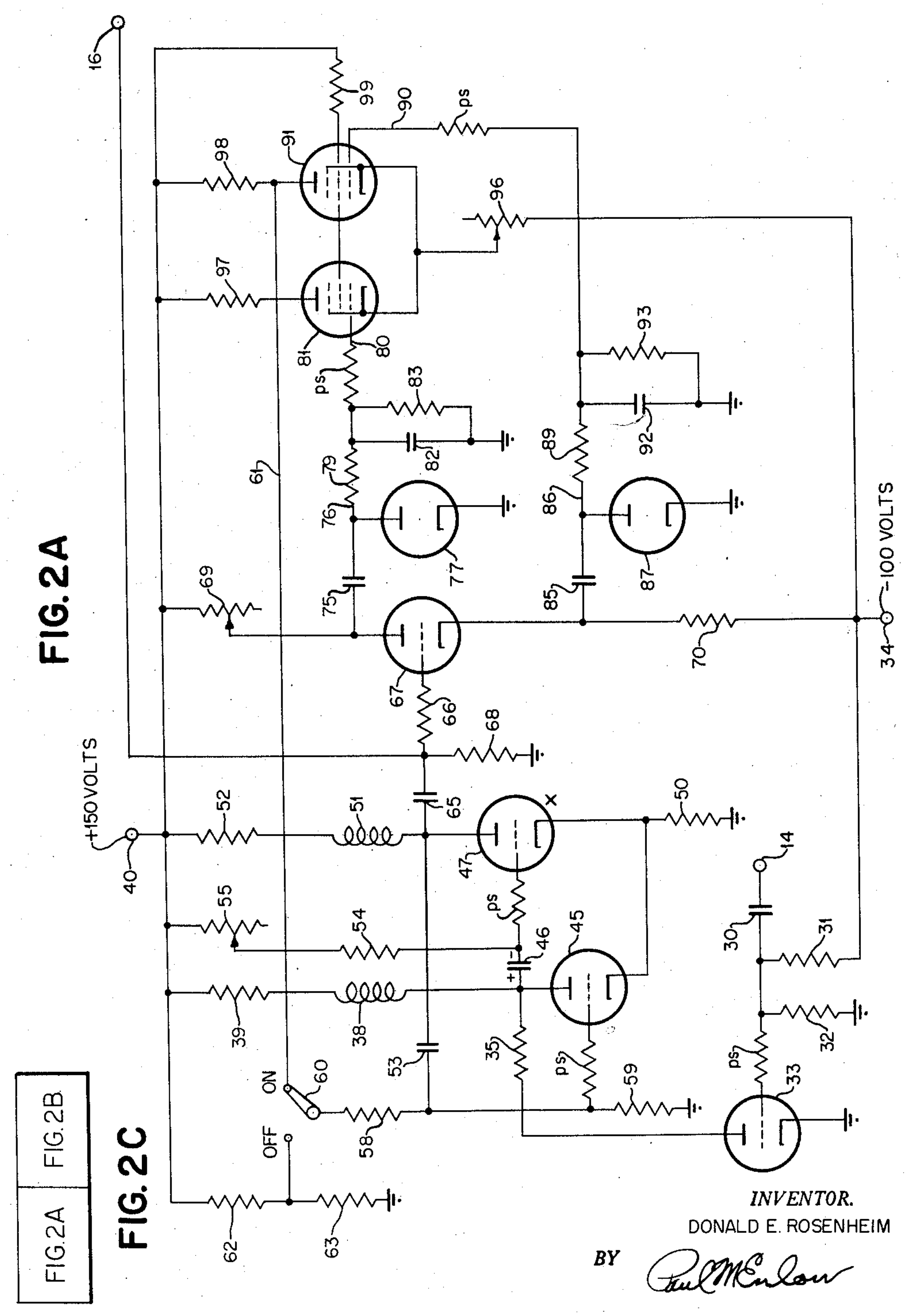
Fig. 2A is a circuit diagram of the compensating pulse generator.
Figures 3A, 3B, 3C:
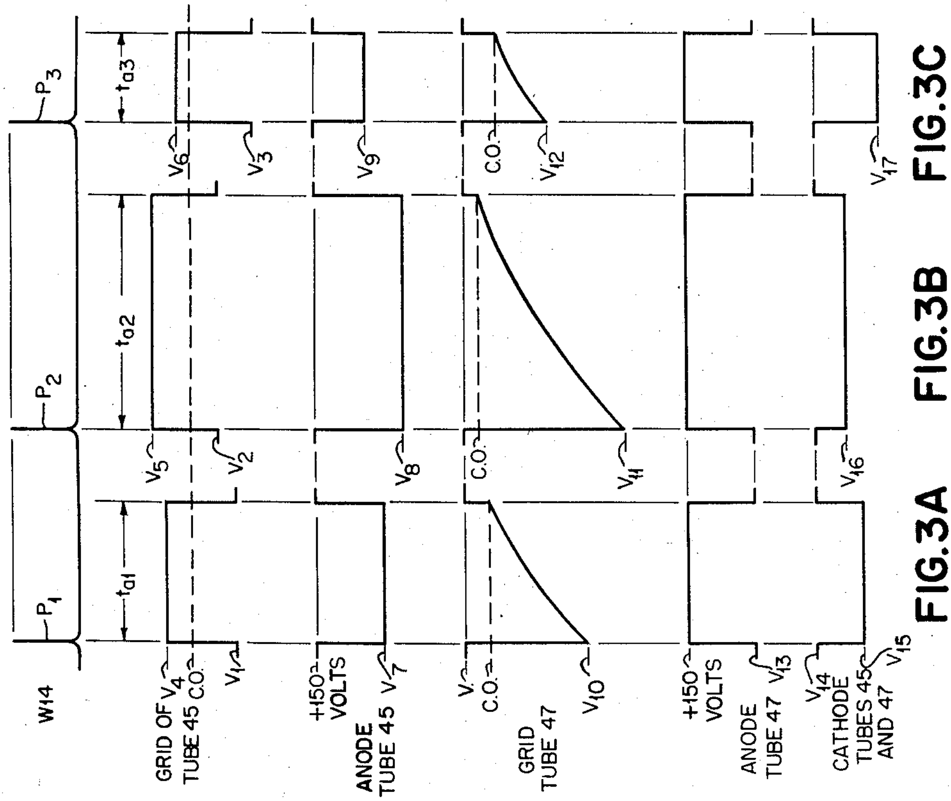
Figure 2B:
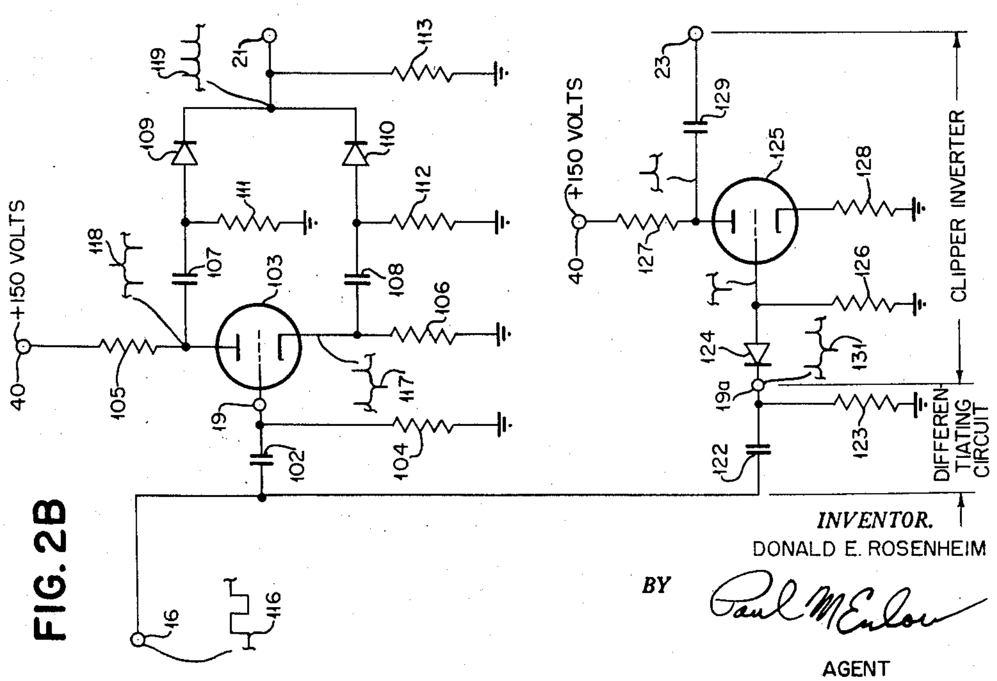
Fig. 2B illustrates differentiating, rectification, and clipper-inverter circuits.
Figure 4:
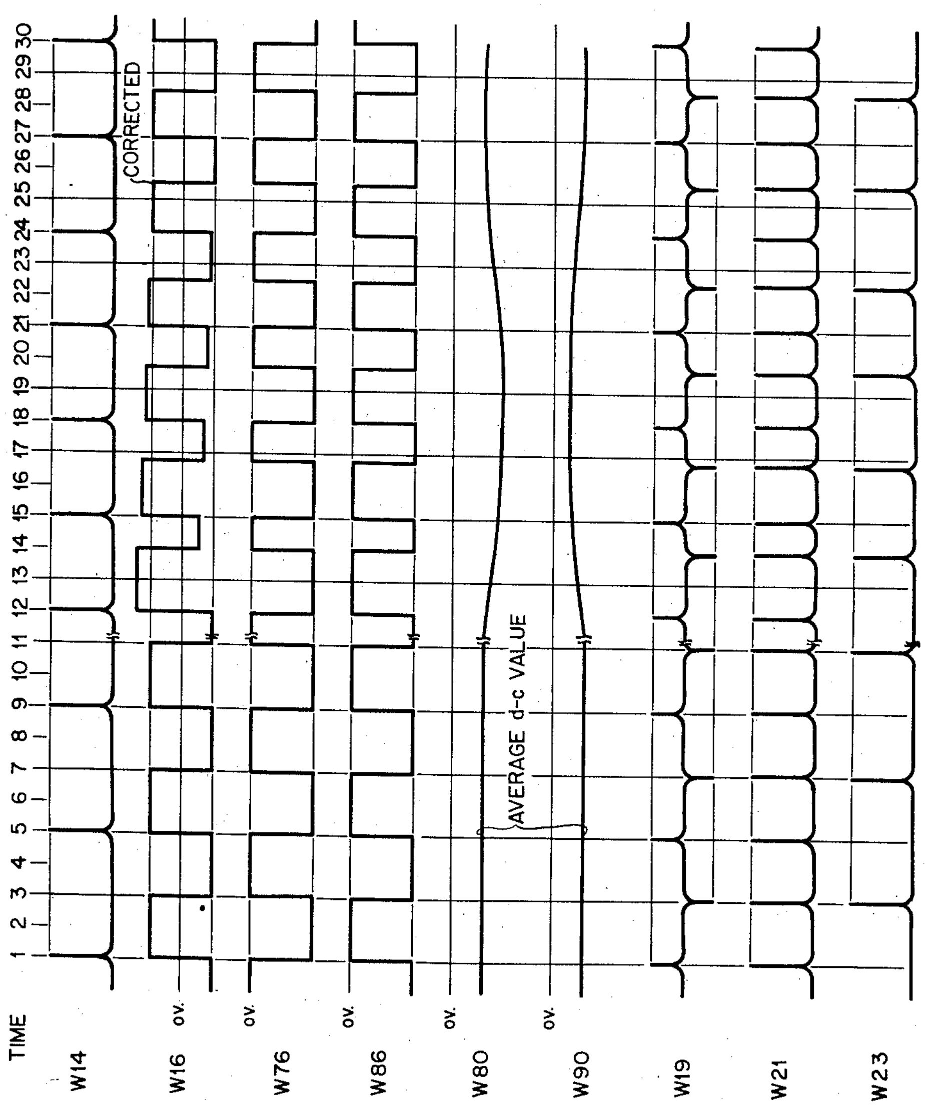
Figure 5:
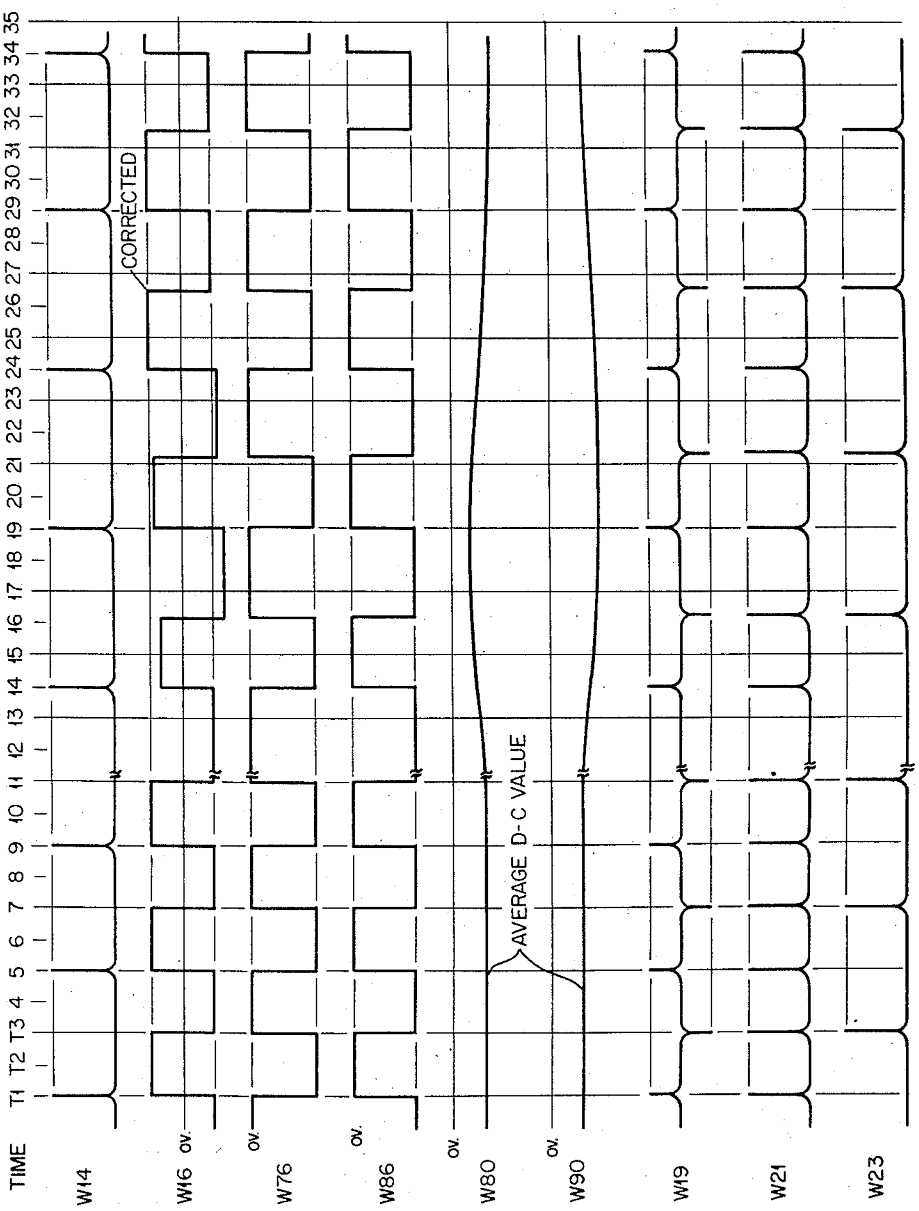
Figure 6A:
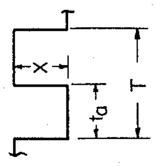
Figure 6B:
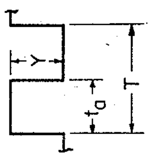
Figures 7, 7A:
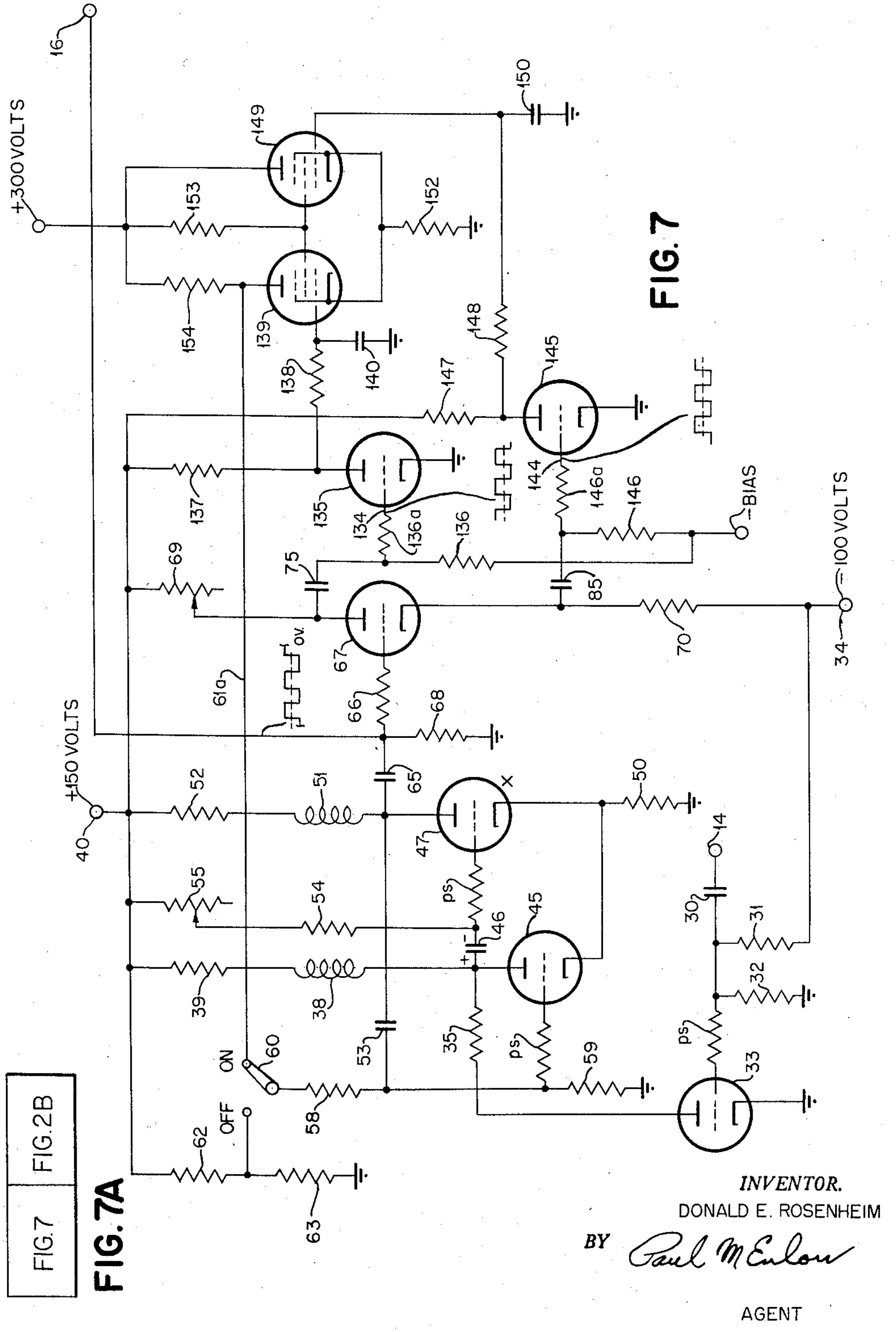
Figures 8A, 8B:
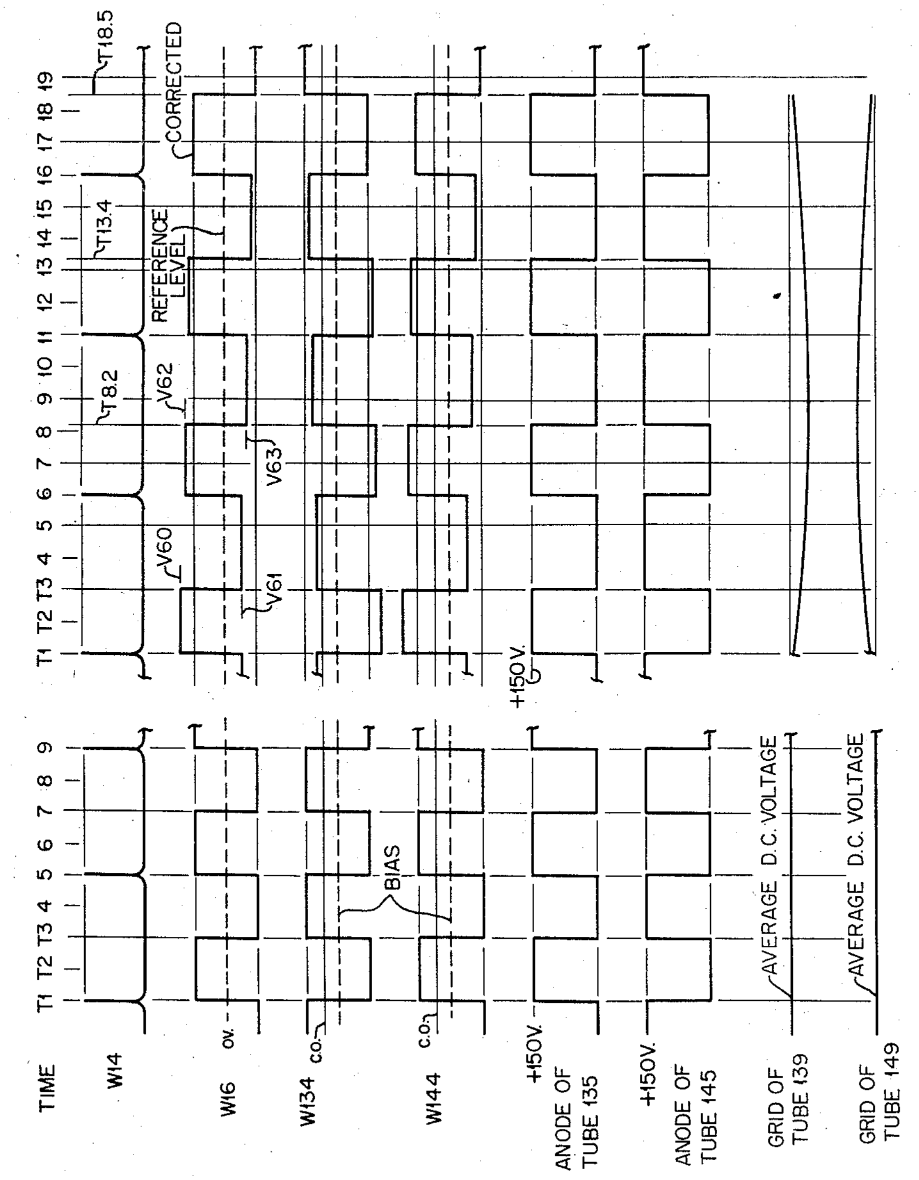
Figures 9, 9A:
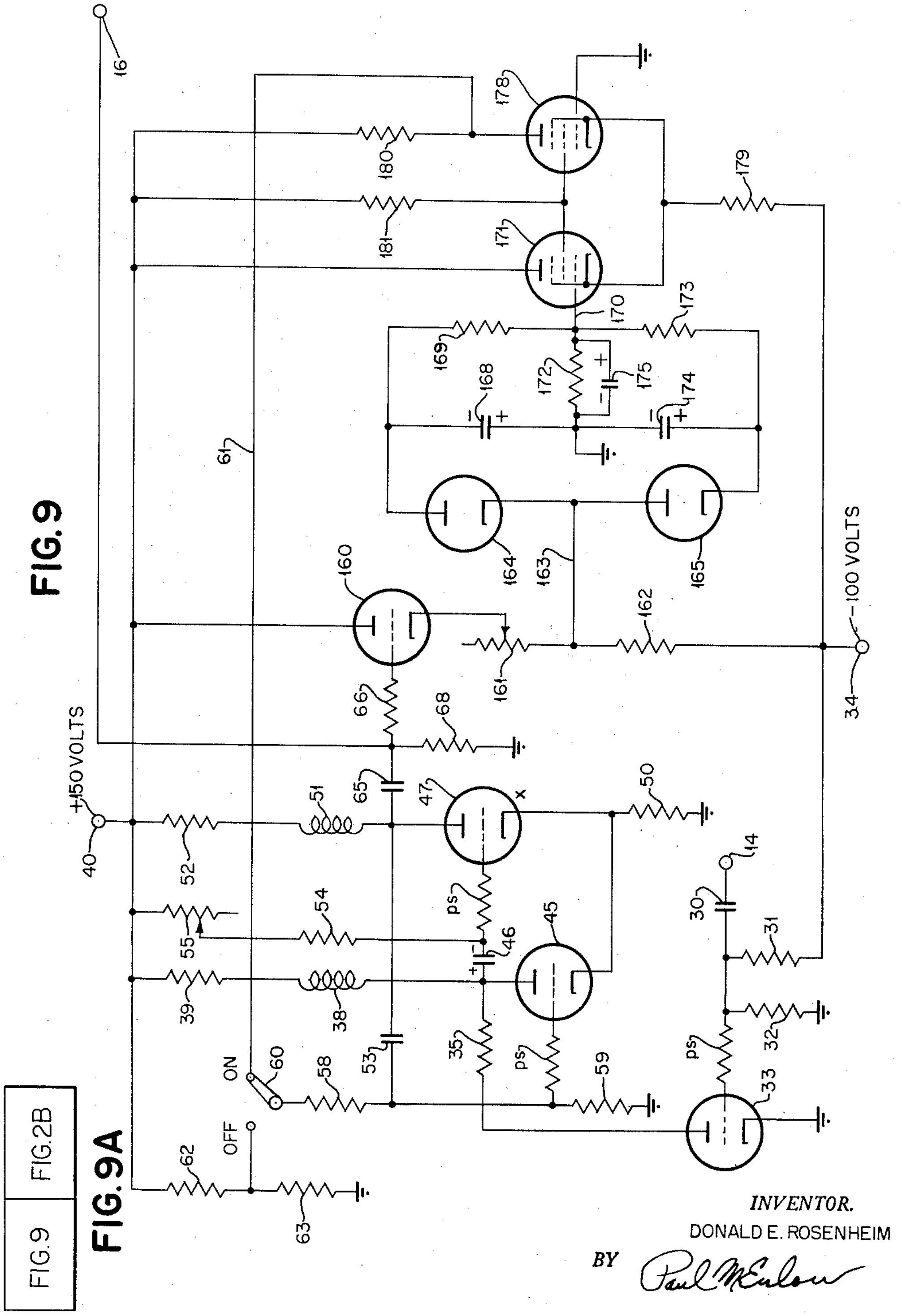
Figures 10, 10A:
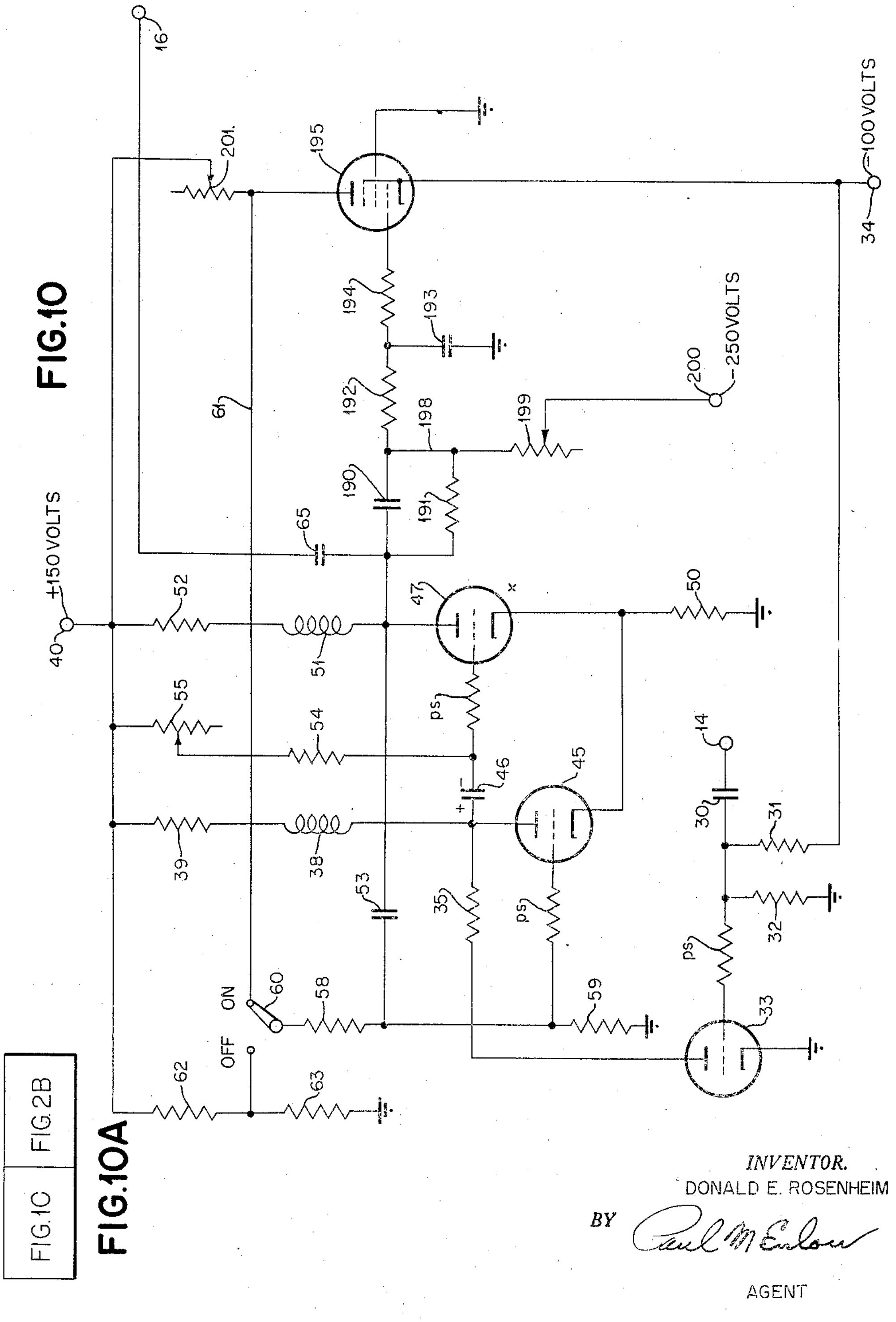

Fig. 2C indicates the arrangement of Figs. 2A and 2B;

Figs. 3A, 3B, and 3C illustrate voltage waveforms associated with the circuit of Fig. 2A;

Fig. 4 shows the wavefroms of Figs. 2A and 2B where the repetition rate of waveform W14 is increased;

Fig. 5 shows the wavefroms of Figs. 2A and 2B where the repetition rate of W14 is decreased;

Figs. 6A and 6B illustrate the waveforms used to calculate the predetermined duty cycle of the circuit of Fig. 2A;

Fig. 7 illustrates an alternative embodiment of the circuit of Fig. 2A;

Figs. 8A and 8B illustrate the waveforms associated with Fig. 7;

Fig. 9 illustrates a second alternative embodiment of the circuit of Fig. 2A; and Fig. 10 illustrates a third alternative embodiment of the circuit of Fig. 2A.

Figures 1, 1A:
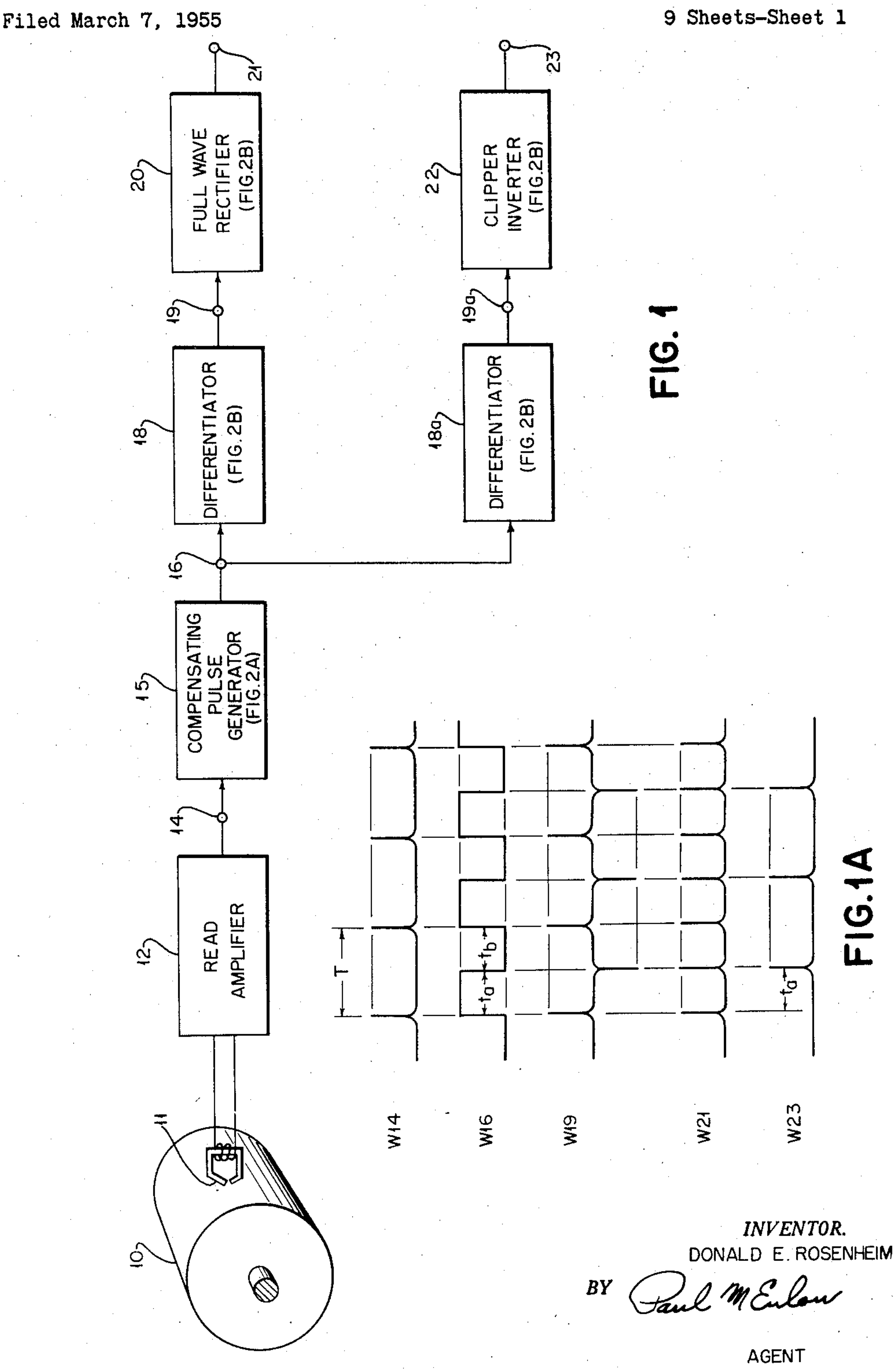
Fig. 1 is a block diagram of a circuit for producing timing and marker pulses which are synchronized with the motion of a magnetic drum.
Fig. 1A illustrates the time relationships between pulses produced by the circuit of Fig. 1.

Referring more particularly to Fig. 1, a block diagram of one embodiment of the invention is illustrated. The rotating magnetic drum 10 is of the type upon which magnetized spots or bits of information can be stored, i.e., of the type frequently used in conjunction with digital computing apparatus as a storage medium.

Frequently, a drum possesses a plurality of tracks so as to store a larger quantity of information. In order to synchronize the operation of various circuits which respond to information read from the drum with the speed of rotation thereof, one of the tracks on the drum is generally used as a sync or timing track.

One method frequently used to provide a sync track is to record a plurality of magnetized spots equidistantly around the drum. These spots are sensed by a read head and the signals generated therefrom are applied to appropriate amplification and pulse-shaping circuits. The latter circuits thus render a series of equally spaced timing or marker pulses. The repetition rate of these timing pulses will have a correlation with the speed of rotation of the drum, and thus can be used to control the reading or writing of information on the drum.

In Fig. 1, the read head 11 is provided to sense the information recorded in a sync or timing track on drum 10. The electrical signals generated within read head 11 are converted to positive pulses by the read amplifier 12 and thus appear on output terminal 14.

The amplifier 12 may be of any suitable type. The circuit of a suitable amplifier is shown in Fig. 18 of the application of John J. Lentz, Serial No. 388,160, filed October 26, 1953, and assigned to the same assignee as the present application.

An indealized representation of the voltage waveform present on terminal 14 is illustrated in Fig. 1A as waveform W14. Conjoint reference to Figs. 1 and 1A is made hereinafter When the angular velocity of drum 10 is constant, the time T elapsing between adjacent pulses is also constant. Time period T is inversely proportional to the speed of rotation of the drum Accordingly, if the angular velocity or speed of the drum is increased, time T is decreased, whereas a decrease in the speed of the drum causes time T to be increased.

The signals present on terminal 14 of Fig. 1 are delivered to the compensating pulse generator 15. The output signal from pulse generator 15 is a rectangular wave which appears on terminal 16. The waveform present on this terminal is shown in Fig. 1A as W16.

One cycle of rectangular wave W16 is executed during a time T. The first portion of each cycle during which the rectangular wave is Up generally exists for time $t_a$. The square wave subsides to a Down condition for time $t_b$, during the latter portion of each cycle. It is evident from Fig. 1A that $t_a+t_b$ equals time T.

The novel circuitry of the compensating pulse generator 15 is such that time $t_a$ of each cycle can be adjusted to be a predetermined portion of each cycle. For example, circuit 15 can be adjusted so that $t_a$ equals $t_b$, that is, rectangular wave W16 has a fifty percent duty cycle. The duty cycle of the rectangular wave is defined as $t_a$ divided by T and expressed as a percent. As a further example, if circuit 15 is adjusted so that $t_a$ equals three tenths of time T, rectangular wave W16 is said to have a thirty percent duty cycle.

It will be explained hereinafter that the compensating pulse generator 15 is operative to automatically maintain the period $t_a$ (during which the square wave is Up) as a predetermined portion of period T. In other words, if time $t_a$ is adjusted to be fifty percent of period T, for example, and time T is increased (speed of drum 10 is decreased), circuit 15 automatically causes $t_a$ to become fifty percent of the increased time period.

The rectangular wave W16 on terminal 16 is differentiated by the differentiator circuit 18. A positive pulse is produced by differentiator 18 in response to each positive direction change in the rectangular wave whereas a negative pulse is produced for each negative direction change in W16. The differentiated representation of rectangular wave W16 appears on terminal 19, and is represented in Fig. 1A as waveform W19.

It should be noted in Fig. 1A that a period of time $t_a$ elapses after the beginning of each rectangular wave cycle before a negative pulse occurs in waveform W19. Since each positive pulse of waveform W14 initiates a cycle of rectangular wave W16, it is apparent that each negative pulse of waveform W19 corresponds to a delay equal in time to $t_a$.

In order to convert the negative pulses of waveform W19 to positive pulses, and at the same time retain the positive pulses of this waveform, the signal on terminal 19 of Fig. 1 is applied to the full wave rectification circuit 20. The output signal of circuit 20 is a train of positive pulses which appear on terminal 21. The timing of these pulses is indicated in Fig. 1A as waveform W21. The original frequency W14 therefore has been doubled or multiplied by two resulting in waveform W21.

The pulses present on terminal 21 of Fig. 1 may be used as timing or clock pulses by circuits which must operate in conjunction with drum 10. Thus, circuits of a digital calculator, for example, which are timed by the pulses present on terminal 21 are caused to operate in synchronism with the drum 10 even though the angular velocity of the drum changes.

It is to be noted that in certain applications it is necessary to obtain a series of timing pulses in synchronism with the drum, where the number of timing pulses required per revolution is greater than the bit density of the drum permits. Therefore it becomes necessary to multiply the repetition rate of the pulses obtained from the drum. It is evident that standard frequency multiplication methods including a resonant circuit cannot be used for this application since the resonant circuit will only accommodate pulses of a given frequency That is, a resonant circuit would not respond to a change in the repetition frequency of the timing pulses obtained from the drum as a result of a change in angular velocity. As will be shown below, the system of Fig. 1 responds to a change in repetition frequency of the timing pulses obtained from the drum so as to produce an exact multiple thereof.

In certain instances it may be desired that each pulse of the train of pulses appearing on terminal 14 be delayed a predetermined portion of the time occurring between adjacent pulses. It was noted above that each negative pulse present on terminal 19 appears at a time $t_a$ after the next preceding positive pulse, i.e., each negative pulse represents a time delay equal to $t_a$. Thus, pulses similar to the negative pulses on terminal 19 can be utilized to produce a delayed representation of waveform W14 of Fig. 1A.

The rectangular wave W16 present on terminal 16 is applied to and differentiated by differentiator 18*a* which is identical to differentiating circuit 18. Thus the waveform appearing on output terminal 19*a* of differentiator 18*a* is also represented by waveform W19 of Fig. 1A.

The differentiated signal on terminal 19*a* is applied to the input of clipper inverter 22 as indicated in Fig. 1. The clipper-inverter circuit 22 effects the removal of the positive pulses and the inversion of the negative pulses of waveform W19 so as to produce the voltage waveform W23 of Fig. 1A which is present on terminal 23 of Fig. 1. Accordingly, waveform W23 corresponds to W14 but is delayed by a period of time equal to $t_a$, where $t_a$ is maintained by circuit 15 as a predetermined portion or percentage of the period of one rectangular wave cycle.

The manner in which the automatically adjustable frequency multiplication and delay circuit 15 of Fig. 1 is responsive to an increase or a decrease in the speed of rotation of drum 10 in order to maintain the pulses on terminals 21 and 23 in synchronism with timing pulses read from the drum is disclosed hereinbelow.

Referring more particularly to Fig. 2, the input pulses (waveform W14 of Fig. 1A) representing timing pulses read from drum 10 (Fig. 1) by read head 11 and amplified by amplifier 12 (Fig. 1) are applied to terminal 14 of Fig. 2A. Terminal 14 is connected through coupling capacitor 30 to the juncture of resistors 31 and 32. This juncture is also connected through the parasitic suppressing resistor *ps* to the control grid of triode inverter 33. Resistors 31 and 32 constitute a voltage divider connected between ground and the —100 volt terminal 34 and serve to bias the grid of tube 33 below the cut-off potential thereof.

The anode of inverter 33 is connected through resistor 35, peaking inductance 38, and resistor 39, in series, to the +50 volt terminal 40. Resistor 35, inductance 38 and resistor 39 comprise the plate load impedance for inverter 33.

The juncture of resistor 35 and inductance 38 is connected to the anode of triode 45, and is also connected through coupling capacitor 46 and parasitic suppressing resistor *ps* to the control grid of triode 47.

Thus, the positive pulses applied to input terminal 14 of Fig. 2A are inverted by inverter 33 and appear as negative pulses at the common connection of resistor 35 and inductance 38. These negative direction pulses are then coupled through capacitor 46 to the grid of triode 47 which is normally conductive.

The triode tubes 45 and 47 comprise a single cycle multivibrator having a single stable state wherein tube 45 is normally non-conductive and the tube 47 is normally conductive as indicated by the "X" to the lower right thereof. When the single cycle multivibrator is in its stable state it is said to be Off, whereas it is said to be On when tube 45 is conductive and tube 47 is cut off.

The cathodes of tubes 45 and 47 are connected together and through cathode resistor 50 to ground. The anode of tube 47 is connected through the peaking inductance 51 and resistor 52, in series, to the +150 volt terminal 40. The anode of this tube is also connected through capacitor 53 and the parasitic suppressing resistor resistor *ps* in series to the control grid of tube 45. The control grid of tube 47 is connected through a parasitic suppressing resistor *ps*, resistor 54, and potentiometer 55, all in series, to the +150 volt terminal 40. The control grid of triode 45 is connected through a parasitic suppressing resistor *ps* to the juncture of resistors 58 and 59 and to the left-hand plate of capacitor 53. Resistors 58 and 59 are connected in series between the blade of switch 60 and ground.

When switch 60 is in the On position, the frequency of the single cycle multivibrator is automatically adjusted by the potential appearing on conductor 61 as explained hereinafter. The automatic operation of the circuit of Fig. 2A is disrupted when switch 60 is in the Off position. The switch is provided so as to be able to manually adjust the frequency of the multivibrator when a known bias potenital is applied to the grid of tube 45. This known bias voltage appears at the juncture of resistors 62 and 63 which comprise a voltage dividing network connected between the +150 volt terminal 40 and ground. By placing switch 60 in the Off position, the potential present at the juncture of resistors 62 and 63 is applied through resistors 58 and *ps* to the control grid of triode tube 45.

When the single cycle multivibrator is in its only stable state, i.e., is Off, triode 47 is highly conductive because the control grid thereof is connected through resistors *ps* and 54 and potentiometer 55 to +150 volts. The current flowing through tube 47 produces a voltage drop across cathode resistor 50 which is positive with respect to ground.

Assuming for the present that switch 60 is place in the Off position, the control grid of tube 45 is at a potential several volts above ground potential. However, tube 45 actually has a negative grid to cathode potential due to the voltage drop across resistor 50 which cuts off this tube.

Figs. 3A, 3B, and 3C indicate idealized waveforms existing at various points of the single cycle multivibrator of Fig. 2A when it is On (tube 45 conducting) under certain circumstances described below.

During the time that triode 45 is cut off, capacitor 46 is charged to a high potential having the polarity indicated in Fig. 2A. The application of a positive direction pulse such as P1 of waveform W14 of Fig. 3A to input terminal 14 of Fig. 2A causes a negative direction pulse to appear at the juncture of resistor 35, inductance 38, capacitor 46, and the anode of tube 45. Since the voltage across capacitor 46 cannot change instantaneously, the negative pulse at said juncture is applied through the capacitor to the grid of tube 47, thereby causing the voltage at this grid to drop an amount at least equal to the amplitude of the negative pulse.

As the potential at the grid of tube 47 begins to decrease, the current through this tube begins to decrease whereupon the voltage at the anode thereof increases while the voltage drop across cathode resistor 50 tends to decrease. The positive direction signal at the anode of tube 47 causes a positive signal to be applied through capacitor 53 to the control grid of tube 45 which, in conjunction with the lower voltage across cathode resistor 50, permits tube 45 to start conducting. The current flowing through resistor 50 due to the conduction of tube 45 tends to maintain the voltage drop across this resistor. The voltage drop across resistor 50 constitutes a negative grid to cathode voltage applied to tube 47 and conduction therethrough is decreased.

As tube 45 becomes conductive, the negative direction signal at the anode thereof is coupled through capacitor 46 to the grid of tube 47 so as to reinforce the effect of the negative direction signal applied to this grid by inverter 33 in response to pulse P1 on terminal 14. As the grid of tube 47 goes further negative due to the negative direction signals received thereat, the procedure described continues until tube 47 is cut off and tube 45 is highly conductive.

The single cycle multivibrator is now in its unstable or On state and remains in said state until capacitor 46 discharges sufficiently to permit the grid voltage of tube 47 to rise to a point slightly above the cut off potential of this tube as shown by the fourth waveform of Fig. 3A. This waveform illustrates the voltage between the grid of tube 47 and ground, and thus takes into account the bias voltage developed across cathode resistor 50. The time constant of the circuit which aids in determining the time required for capacitor 46 to discharge sufficiently is principally determined by the values of potentiometer 55, resistor 54, capacitor 46, and the plate resistance of tube 45. The purpose of potentiometer 55 is to provide means for adjusting the time constant of the circuit so as to control the On time of the single-cycle multivibrator. For example, if it is desired that the single-cycle multivibrator produce a symmetrical waveform at the anode of tube 47, potentiometer 55 is adjusted so that the On and Off time thereof are equal. The magnitude of the voltage change at the grid of tube 47 which is necessary to reach the cut-off voltage is also dependent upon the voltage drop across resistor 50 (due to current through tube 45 when the single-cycle multivibrator is On).

Briefly then, pulse P1 (W14) of Fig. 3A is applied to terminal 14 of Fig. 2A and causes the single-cycle multivibrator to be On a period of time $t_{a1}$ as indicated in Fig. 3A. At the end of time $t_{a1}$ the multivibrator is turned Off and so remains until a subsequent pulse is applied to terminal 14. Thus, in response to each input pulse at terminal 14, the single-cycle multivibrator produces a single cycle of a rectangular waveform at the anode of tube 47.

It is to be noted that immediately after the single-cycle multivibrator is turned On capacitor 46 of Fig. 2A begins to discharge with the result that the potential on the grid of tube 47 (see Fig. 3A) rises exponentially towards +150 volts until it reaches the cut-off potential at which the tube begins to conduct current. As tube 47 commences conduction again, the multivibrator is turned Off.

The principal factors which control the On time of the multivibrator then are, first, the amplitude of the negative pulse applied to the grid of tube 47 (this determines voltage from which the grid of tube 47 must rise to reach its cut-off potential), and secondly, the cathode bias voltage developed across resistor 50 when tube 47 is cut off (this bias voltage determines the potential which the voltage between the grid of tube 47 and ground must attain in order to reach the cut-off potential of the tube).

It is readily apparent that both of the factors mentioned which influence the On time of the single-cycle multivibrator are influenced by the operation of triode 45. For example, if the D.C. bias voltage of tube 45 is increased in a positive direction, the tube will conduct more current when it is caused to enter conduction by the negative signal at the common cathode due to tube 47 cutting off. The fact that tube 45 conducts more current requires that its anode potential fall to a lower level wherupon the amplitude of the negative direction signal applied through capacitor 46 to the grid of tube 47 is increased. This means that the grid voltage of tube 47 requires additional time to rise to the level at which the tube enters conduction. Also, since tube 45 is conducting a larger current when the multivibrator is On, the cathode bias voltage developed across resistor 50 is increased so that the grid voltage of tube 47 must rise a greater amount in order to reach the cut-off potential thereof. Accordingly, in the example given, the result of increasing the D.C. bias of tube 45 is to increase the time $t_a$ during which the single-cycle multivibrator is On, i.e., the anode of tube 47 is Up.

It is known that throughout the operating range of the single-cycle multivibrator of Fig. 2A, the On time (i.e., the length of time that the anode of tube 47 is Up) bears a direct relationship to the D.C. bias voltage applied between the grid of tube 45 and ground. The waveforms of Fig. 3A illustrate the operation of the single-cycle multivibrator when a D.C. bias potential of $V_1$ is applied to the grid of tube 45, Fig. 3B illustrates similar waveforms when $V_1$ is changed in a positive direction to a value of $V_2$, and Fig. 3C shows the same waveforms under conditions where the D.C. bias of this tube is changed to a value $V_3$ which is more negative than $V_1$. With respect to Fig. 2A, it should be understood that the D.C. voltage $V_1$, $V_2$, or $V_3$ can be the potential on lead 61 when switch 60 is in the On position.

In Fig. 3A the application of pulse $P_1$ to terminal 14 (Fig. 2A) turns the multivibrator On so that conduction is transferred from tube 47 to tube 45. The grid voltage of tube 47 drops to a value $V_{10}$ while the anode increases to +150 volts. Accordingly, the grid voltage of tube 45 rises from the D.C. bias level $V_1$ to a value $V_4$. When tube 45 becomes conductive its anode voltage drops from +150 volts to $V_7$ and the voltage at the cathode thereof drops from $V_{14}$, the potential across resistor 50 when tube 47 is conductive, to $V_{15}$. The single-cycle multivibrator remains On for a period of time equal to $t_{a1}$.

Consider a second situation where the D.C. bias voltage $V_2$ is applied to the grid of triode 45, $V_2$ being more positive than $V_1$, and that pulse $P_2$ (W14) of Fig. 3B is applied to terminal 14 (Fig. 2A). Pulse $P_2$ turns the multivibrator On whereupon the tube 47 becomes nonconductive so that its anode rises from $V_{13}$ to +150 volts. The signal at the common cathode resistor 50 renders tube 45 conductive more abruptly than in the previous example where the grid-to-cathode voltage of tube 45 was more negative. The increased current flowing through tube 45 causes its anode voltage to drop to $V_8$ (which is less positive than $V_7$). The increased amplitude of the signal at the anode of tube 45 is responsible for causing the grid voltage of tube 47 to drop to $V_{11}$ (more negative than $V_{10}$). The larger current through tube 45 also causes the cathode voltage thereof to drop only to $V_{16}$, where $V_{16}$ is more positive than $V_{15}$. Since the cathode bias applied to tube 47 is now larger than under the conditions corresponding to Fig. 3A, the grid voltage of this tube must rise to a higher potential in order to reach the grid-to-cathode cut-off potential. The overall result of increasing $V_2$ positively is to increase the time duration $t_{a2}$ during which the single-cycle multivibrator is On.

A similar analysis of a third situation shown in Fig. 3C illustrates that when the D.C. bias voltage $V_3$ applied to the grid of tube 45 is less positive than $V_1$ of Fig. 3A and the single-cycle multivibrator of Fig. 2A is turned On by pulse $P_3$, this tube conducts a smaller current than under the conditions associated with Fig. 3A. The smaller current flower through tube 45 causes its anode to drop to $V_9$ ($V_9$ being more positive than $V_7$), which in turn requires the grid voltage of tube 47 to drop only to $V_{12}$ (less negative than $V_{10}$). Due to the smaller cathode voltage $V_{17}$ (less positive than $V_{15}$) the grid voltage of tube 47 (Fig. 3C) need not rise as high as required in the case of Fig. 3A in order to reach the cut-off potential of this tube. Accordingly, the multivibrator is On for a period $t_{a3}$ when $V_3$ of Fig. 3C is the D.C. bias applied to the grid of tube 45. The time interval $t_{a3}$ is shorter than either $t_{a1}$ or $t_{a2}$ of Figs. 3A and 3B, respectively.

It is now evident that as the D.C. bias voltage applied to the grid of tube 45 is increased in a positive direction the On time of the single-cycle multivibrator of Fig. 2A is increased whereas the On time is decreased when said D.C. bias becomes more negative. That is, the On time during which tube 47 is now conductive is a function of the D.C. grid bias of tube 45.

The anode of triode 47 (Fig. 2A) is connected through capacitor 65 to output terminal 16, through the grid current limiting resistor 66 to the control grid of triode tube 67, and also through resistor 68 to ground. Tube 67 comprises a phase inverter having its anode connected through potentiometer 69 to the +150 volt terminal 40, and its cathode connected to the −100 volt terminal 34 through resistor 70. The proper adjustment of potentiometer 69 is discussed hereinafter.

The rectangular wave present on the anode of triode 47 is coupled through capacitor 65 to output terminal 16. The waveform present on terminal 16 is illustrated in Figs. 1A, 4, and 5 as waveform W16.

The waveform of the signal present at the cathode of phase inverter 67 is in phase with and thus is similar to W16. Waveform W16 is inverted by tube 67 so that the signal present at the anode thereof is the inverse of the waveform at the grid and cathode of this tube.

The anode of triode 67 is connected through coupling capacitor 75 to juncture 76 which is also connected to the anode of diode rectifier 77. The cathode of rectifier 77 is connected to ground. Juncture 76 is also connected through resistors 79 and *ps* to the control grid 80 of pentode tube 81. Grid 80 is also connected through resistor *ps* in series with the parallel combination of capacitor 82 and resistor 83 to ground.

In a similar manner, the cathode of phase inverter 67 is coupled by capacitor 85 to juncture 86. The cathode of diode rectifier 87 is connected to ground and the anode thereof is attached to juncture 86. Resistor 89 is connected in series with parasitic suppressing resistor *ps* between juncture 86 and the control grid 90 of pentode tube 91. The common connection of resistors *ps* and 89 is connected through capacitor 92 and resistor 93 to ground, where the latter two components are connected in parallel.

The pair of pentode tubes 81 and 91 comprise a differential amplifier wherein the cathodes of said tubes are commonly connected through potentiometer 96 to the −100 volt terminal 34, and their anodes are respectively connected through plate load resistors 97 and 98 to the +150 volt terminal 40. Potentiometer 96 is used to adjust the operating point of pentodes 81 and 91. The suppressor grids of tubes 81 and 91 are each connected to their respective cathodes, whereas their screen grids are connected together and through the screen voltage dropping resistor 99 to the +150 volt terminal 40. The anode of tube 91 is also connected by lead 61 to the On side of single pole, double throw switch 60.

The rectangular wave appearing at the anode of inverter 67 is A.C. coupled by capacitor 75 to the anode of diode rectifier 77 which operates as a clamping diode. Diode 77 will conduct current whenever point 76 attempts to become more positive than ground potential, but is non-conductive when this point is negative. Thus, the voltage waveform at juncture 76 will have approximately the same shape as the signal at the anode of inverter 67, but will have a different D.C. level. Regardless of the amplitude or the D.C. level of the signal voltage on the left-hand plate of capacitor 75, the positive peaks of the voltage waveform at point 76 will be at zero volts. The signal at points 76 is said to have its positive peaks "clamped" at zero or ground potential. The waveform at juncture 76 is shown in Figs. 4 and 5 as waveform W76.

Waveform W76 is applied to an RC integrating circuit comprising resistor 79 and capacitor 82 which integrates waveform W76 to determine the D.C. time-average value thereof. Waveform W80 illustrated in Fig. 4, for example, is the result of this integration and is present at grid 80 of pentode 81.

Referring briefly to Fig. 4, it is apparent that if each cycle of waveform W76 is symmetrical as shown during time T1—T9 waveform W80 is essentially constant since the integral of the Up portion of a single cycle is equal and opposite to the integral of the Down portion thereof. The average D.C. value of W80 indicated in Fig. 4 is the D.C. voltage applied by the integration circuit (resistor 79 and capacitor 82) of Fig. 2A to the control grid of tube 81.

As stated above the waveform at the cathode of phase inverter 69 (Fig. 2A) is the inverse of the signal at the anode of this tube. The signal at the cathode of inverter 67 is A.C. coupled to the anode of diode 87. Diode 87 operates as a clamping diode in the manner described above for diode 77. Thus the positive peaks of the waveform at juncture 86 are clamped at zero volts. The waveform at juncture 86 is shown in Figs. 4 and 5 as waveform W86.

Waveform W86 is integrated by an RC integration circuit which includes resistor 89 and capacitor 92 to produce waveform W90 of Fig. 4. Waveform W90 is applied to the control grid of tube 91.

It is apparent in Fig. 4 that as long as rectangular wave W16 has a 50 percent duty cycle (i.e., is respectively Up and Down for 50 percent of a cycle) as is the case during T1—T9, the average D.C. voltages applied to the control grids of pentodes 81 and 91 of the differential amplifier are equal. Thus the anode voltage of tube 91 is at some value V which corresponds to the condition of equal control grid voltages for both tubes of the differential amplifier.

Potentiometer 96 of Fig. 2A is adjusted so that the voltage V at the anode of tube 91 and also on lead 61 is equal to the voltage at the Off side of switch 60 which is connected to the common connection of resistors 62 and 63. Thus, a reference level is established from which the anode voltage of tube 91 may vary as a result of unequal grid voltages being applied to tubes 81 and 91.

The operation of the differential amplifier comprising pentodes 81 and 91 is such that a change in the voltage at the anode of tube 91 is proportional to the difference between the control grid voltages of the two tubes. When, for example, the average D.C. value of waveform W90 is increased an amount by which the average D.C. value of W80 is decreased, the voltage at the anode of tube 91 decreases below the value V. However, if the average grid voltage of tube 81 increases while that of tube 91 decreases, the anode voltage of tube 91 rises above the value V.

It was noted hereinabove that the On time of the single-cycle multivibrator is a function of the D.C. bias voltage applied to the control grid of tube 45. When switch 60 is set to the On position the grid bias voltage of tube 45 is determined by the anode voltage of tube 91. Thus, when the voltage on lead 61 attains a value above V, the On time of the multivibrator is increased, and conversely, the On time is decreased when the voltage on lead 61 subsides to a value beneath V.

Referring to Fig. 2B, terminal 16 is connected through capacitor 102 to terminal 19, the latter terminal being connected to the control grid of phase inverter 103 and through resistor 104 to ground. Capacitor 102 and resistor 104 constitute differentiating circuit 18 of Fig. 1. The anode of triode 103 is connected through resistor 105 to the +150 volt terminal 40, and the cathode thereof is connected through resistor 106 to ground. The anode and cathode of triode 103 are respectively connected through capacitors 107 and 108 to the anodes of diode rectifiers 109 and 110. The anodes of diodes 109 and 110 are respectively connected through resistors 111 and 112 to ground, whereas the cathodes of these diodes are commonly connected to terminal 21 and also through resistor 113 to ground. The triode 103 in conjunction with components 105—113 constitute the full wave rectification circuit 20 of Fig. 1.

Waveform W16, a portion of which is shown in Fig. 2B as waveform 116, present on terminal 16 is applied to the differentiating circuit composed of capacitor 102 and 104 to produce waveform W19 (Fig. 1A). The waveform W19 present on terminal 19 is applied to phase inverter 103 so as to produce the waveforms 117 and 118 at the cathode and anode of tube 103 respectively as illustrated in Fig. 2B. It should be noted that waveform 118 is the inversion of 117. The positive pulses of waveform 117 correspond to the positive direction portions of waveform W16 whereas the negative pulse of 117 corresponds to the negative direction portion of 116. Similarly the negative pulses of waveform 118 correspond to the positive direction portions of waveform 116 and the positive pulse of 118 corresponds to the negative direction portion of 116. It should be appreciated that the waveforms 117 and 118 are merely segments of a continuous train of pulses present at the cathode and anode of triode 103 and only so much of them is shown as corresponding to the portion of waveform 116 shown in Fig. 2B.

The waveform 118 at the anode of triode 103 is coupled through capacitor 107 to the anode of diode 109. The capacitor 107 and resistor 111 comprise a coupling circuit connected between the anodes of triode 103 and diode 109. The first pulse of waveform 118 which is a negative pulse causes the anode of diode 109 to become more negative than its cathode so that this diode is cut off. However, when the second pulse of waveform 118 is applied to the anode of diode 109, the anode becomes more positive than the cathode thereof so as to permit capacitor 107 to charge through the diode and resistor 113 with the result that a positive pulse of waveform 119 appears at the common juncture of the cathode and terminal 21. Thus it is evident that only the positive pulses applied to the anode of diode 109 are permitted to appear on terminal 21.

Capacitor 108 and resistor 112 comprise a coupling network which couples waveform 117 present at the cathode of triode 103 to the anode of diode 110. Here again each negative pulse applied to the anode of diode 110 cuts off the diode so that current does not pass therethrough. However, each positive pulse of waveform 117 applied to this diode cause capacitor 108 to discharge through the diode and through resistor 113 so that a positive pulse appears on terminal 21. Accordingly, the first positive pulse of signal 117 which is applied to diode 110 appears on terminal 21 as the first positive pulse of waveform 119. Thus, it can be stated that the positive pulses of waveform 117 which correspond to the positive pulses of waveform W19 (Fig. 1A) pass through diode 110 so as to appear on terminal 21 as alternate pulses of signal 119. Similarly, the positive pulses of waveform 118 which correspond to the negative pulses of waveform W19 appear on terminal 21 as positive pulses which are interspersed between the alternate pulses appearing thereat as a result of waveform 117.

Each positive pulse of waveform W21 (119 of Fig. 2B) corresponds to a change in potential indicated in waveform W16 (see Fig. 1A). Since waveform W16 is produced in response to the positive pulses of waveform W14 it is apparent that the pulse repetition frequency of W21 is twice that of W14. Since W14 is produced in response to pulses read from the rotating drum 10 (Fig. 1) the pulse repetition frequency of this waveform is proportional to the speed of rotation of the drum. Accordingly, it is now apparent that waveform W21 bears a synchronous relationship to W14 and thus is maintained in synchronism with the speed of rotation of the drum. When the angular velocity of drum 10 increases or decreases, for example, the repetition frequency of the pulses of waveform W14 is respectively increased or decreased so as to cause a similar change to occur in the repetition frequency of the pulses comprising waveform W21.

Returning to Fig. 2B, terminal 16 is connected through capacitor 122 to terminal 19*a*, the latter terminal being connected through resistor 123 to ground and also to the cathode of diode 124. Capacitor 122 and resistor 123 constitute differentiating circuit 18*a* of Fig. 1. The anode of diode 124 is connected to the control grid of triode inverter 125 and also through resistor 126 to ground. The anode and cathode of tube 125 are respectively connected through resistors 127 and 128 to the +150 volt terminal 40 and to ground. The anode of tube 125 is connected through coupling capacitor 129 to terminal 23. Components 124—129 constitute the clipper-inverter circuit 22 of Fig. 1.

The differentiating circuit which includes capacitor 122 and resistor 123 accepts waveform 116 (Fig. 2B) and produces a waveform similar to waveform W19 on terminal 19*a*, a portion of this signal being shown in Fig. 2B as waveform 131. The purpose of the clipper-inverter circuit is to remove the positive pulses of waveform 131 and to invert the negative pulses thereof so that the signal on terminal 23 will constitute a train of positive pulses.

Each positive pulse appearing on terminal 19*a* causes the cathode of diode 124 to become more positive than its anode so that current cannot be conducted therethrough. However, each negative pulse applied to the cathode of this diode renders it conductive whereupon the current passing through diode 124 also passes through resistor 126 causing a negative pulse to appear on the control grid of triode inverter 125. Thus, diode 124 effectively clips or removes the positive pulses present in the waveform applied to terminal 19*a*.

The negative pulses applied to the control grid of tube 125 render the tube non-conductive so that the anode potential thereof increases during this time which causes a positive pulse to appear at the anode. The positive pulse at the anode of tube 125 is applied through coupling capacitor 129 to terminal 23. The positive pulses appearing on terminal 23 are indicated in Fig. 1A as waveform W23.

Since each pulse of waveform W23 corresponds to a negative pulse of waveform W19, it must correspond to the termination of the On time of the single-cycle multivibrator of Fig. 2A. Accordingly, it will be noted that each positive pulse of waveform W23 is produced in response to a pulse of waveform W14 which occurred a time interval $t_a$ immediately prior thereto. In other words, each pulse of waveform W14 has a corresponding pulse in waveform W23 which is delayed by a time interval $t_a$.

It will be shown hereinafter that waveform W23 will be maintained in synchronism with waveform W14 by the circuits of Figs. 2A and 2B when the speed of rotation of the drum is changed.

It is understood that the differentiating circuits, full wave rectification circuit and clipper-inverter circuit of Fig. 2B may comprise any suitable circuit.

Referring more particularly to Fig. 4, waveforms existing in the circuits of Figs. 2A and 2B are illustrated under circumstances where the speed of rotation of drum 10 is increased from a first speed to a second speed. It is apparent that when the speed of rotation of the drum is constant the pulses appearing on terminal 14 of Figs. 1 and 2A will be of a constant repetition frequency, i.e., the time existing between adjacent pulses is equal. When the speed of rotation of the drum is increased to a second constant speed the time interval occurring between adjacent pulses of waveform W14 is decreased.

The signal on terminal 14 under conditions when the rotational speed of the drum is increased from a first value to a second value is illustrated in Fig. 4 as waveform W14. For convenience of reference the time scale appearing at the top of Fig. 4 has arbitrarily been divided into intervals designated as T1—T30. It will be noted that between the first and second and the second and third pulses of W14, four time intervals exist whereas between each of the remaining adjacent pulses three time intervals exist. This representation corresponds to the condition wherein the speed of rotation of the drum is increased some time during the time intervals T9—T12. Practically, this increase in speed of the drum would require a plurality of time intervals. The breaks shown in the waveforms of Figs. 4 and 5 indicate that a change in speed of the drum 10 has taken place.

Let it be assumed that the circuit of Fig. 2A is adjusted so that the single-cycle multivibrator has a fifty percent duty cycle, i.e., the signal on terminal 16 is Up for a time interval equal to the time that the signal is Down, when a series of pulses of a constant repetition frequency are applied to terminal 14. The method by which the circuit of Fig. 2A is adjusted to provide these conditions is discussed hereinbelow.

The first pulse of W14 of Fig. 4 which is applied to terminal 14 causes the single-cycle multivibrator to be turned On such that terminal 16 is Up during T1—T3 and Down during T3—T5 as shown by waveform W16. Thus the signal on juncture 76 is Down during T1—T3 and Up during T3—T5 as indicated by W76 (Fig. 4). During the same time intervals W86 present at juncture 86 is respectively Up and Down. Since the signals on junctures 76 and 86 are Up a time interval equal to the time that said signals are Down, the average D.C. value of the grid voltages present on grids 80 and 90 of tubes 81 and 91, respectively, are constant. Accordingly, the voltage at the anode of tube 91 which is present on lead 61 does not change so that the grid voltage of tube 45 also remains constant. This assumes that switch 60 is placed in the On position.

It will be noted that the pulses comprising W19 of Fig. 4 are alternately positive and negative and the time intervals occurring between successive positive and negative pulses are equal during the interval T1—T5. W21 consists of a series of positive pulses occurring at T1, T3 and T5 in response to the waveform present on terminal 16. A positive pulse occurs on terminal 23 as indicated by W23 of Fig. 4 in response to the pulse of W14 occurring at T1 time.

Due to the fact that the time intervals occurring between the first and second and the second and third pulses of W14 are equal, the waveforms W16, W76, W86, W80, W90, W19, W21 and W23 constitute a repetition during T5—T9 of their patterns of that indicated during the interval T1—T5. The interval T1—T5 constitutes a single cycle of the rectangular waveform present on terminal 16.

The pulse on W14 which occurs at T9 time again causes the single-cycle multivibrator to be turned On during T9—T11. The time during which terminal 16 is Up beginning at T9 must be equal to the time that this terminal is On during previous cycles due to the fact that up to T9 the average D.C. grid potentials present on grids 80 and 90 have remained constant as indicated by W80 and W90 (Fig. 4). At time T11, terminal 16 goes Down and remains Down until the single-cycle multivibrator is again turned On by the application of a pulse to terminal 14.

The example illustrated in Fig. 4 indicates that during the time interval T9—T12 the speed of rotation of the drum is increased such that a pulse which would have occurred at T13 on terminal 14 had the drum speed remained constant now occurs at T12. The pulse on terminal 14 at T12 time causes the single-cycle multivibrator to be turned on whereupon terminal 16 goes Up at this time. With respect to W16, it is noted that the cycle occurring between T9—T12 is composed of a positive signal during T9—T11 and a negative signal during T11—T12 such that the duty cycle thereof is no longer fifty percent. Accordingly, W76 is Down during T9—T11 and Up during T11—T12, whereas W86 is Up during T9—T11 and Down during T11—T12. Since W76 is Down for a greater period of time than it is Up during the interval T9—T12, the time average value thereof is decreased so that the average D.C. value of the grid voltage present at grid 80 begins to decrease as indicated by W80. During the same interval, T9—T12, W86 is Up for a greater period of time than it is Down with the result that the time average value and thus the average D.C. value of the grid voltage applied to grid 90 is increased as indicated by W90.

Since the D.C. potential present on grid 90 of tube 91 (Fig. 2A) is increased and the grid voltage of tube 81 is decreased, tubes 91 and 81, respectively, conduct more and less current which causes the anode potential of tube 91 to decrease. When the potential on lead 61 is decreased, the D.C. grid voltage applied to tube 45 is also decreased so that the next time the single-cycle multivibrator is turned On, the On time thereof will be decreased slightly.

Thus the pulse of W14 occurring at time T12 turns On the single-cycle multivibrator which remains On for a period slightly less than the interval T12—T14 as indicated in Fig. 4. Again since W16 is Up a greater period of time than it is Down, the time average value signal on grid 80 is again decreased while the time average value of the signal applied to grid 90 is increased as indicated by waveforms W80 and W90 of Fig. 4. Consequently, the current flowing through tube 91 increases, whereas the current flowing through tube 81 decreases with the result that the potential on lead 61 is further decreased. Due to the fact that the potential on lead 61 is less positive, the grid voltage of tube 45 is decreased so that the time during which the single-cycle multivibrator will be On in response to the next pulse applied to terminal 14 will be decreased.

The pulse of W14 occuring at time T15 again turns the single-cycle multivibrator On where the On time thereof is decreased from what it was during the previous cycle as indicated by W16. The process described whereby the On time of the single-cycle multivibrator is decreased when each subsequent pulse is applied to terminal 14 continues until time T21, as indicated by the waveforms of Fig. 4. It will be noted that during the cycle of the single-cycle multivibrator occurring between time T21—T24, terminal 16 is Up for a slightly greater period of time than it is Down, so that the time average values of W76 and W86 commence returning to their previous values as indicated by W80 and W90. At time T24, the time average values of the D.C. potentials applied to grids 80 and 90 become fairly stabilized as indicated by W80 and W90 at values which are respectively more negative and more positive by a small amount than their values at time T1. It will be noted in Fig. 4 that the average D.C. value of W80 at time T24 has increased negatively in amount over its value at T1 which is equal to the amount by which W90 has become more positive over its value at T1. Since the average D.C. values applied to grids 80 and 90 are now stabilized the single-cycle multivibrator will be On during T24—T25.5 in response to the pulse applied to terminal 14 at time T24 which is equal to the interval between T25.5 and T27 when the multivibrator is Off. In other words, the control grid potentials applied to tubes 81 and 91 have controlled the differential amplifier in a manner such that the grid voltage of tube 45 is slightly decreased to a point where the fifty percent duty cycle of the single-cycle multivibrator has been restored. The amount by which this grid voltage has been decreased is referred to as the error voltage necessary to maintain the predetermined duty cycle of the multivibrator.

If the pulses applied to terminal 14 continue to be equally spaced as indicated during T24—T30 of W14, the fifty percent duty cycle of the single-cycle multivibrator will be maintained and the signal on terminal 16 will be Up a period of time equal to the period when it is Down.

The waveform W16 of Fig. 4 indicates that the time interval T9—T24 is required to adjust the On time of the multivibrator so as to restore the fifty percent duty cycle. The time required to correct the On time of the single-cycle multivibrator is a function of the time constant of the integrating circuits of Fig. 2A which include resistor 79 and capacitor 82 and also resistor 89 and capacitor 92. Thus while the example of Fig. 4 indicates that the time interval T9—T24 is required to adjust the On time of the single-cycle multivibrator to its new value, the time actually required would depend upon the values of the components used in the integrating circuits.

With respect to waveform W21 of Fig. 4 it is to be noted that the time intervals existing between adjacent pulses are equal during the period T1—T11. The time elapsing between adjacent pulses is not equal following time T11 and will not be equal until such time as the On time of the multivibrator becomes completely adjusted. Thus following time T24 of Fig. 4, the positive pulses present on terminal 21 are equally spaced as indicated by W21. It is apparent then that after the On time of the multivibrator is adjusted to its new value, the timing pulses appearing on terminal 21 again have a synchronous relationship with the new speed of rotation of the drum.

It also should be noted that the following time T26, the time elapsing between adjacent pulses appearing on terminal 23 will be constant as indicated by W23. Since the circuit of Fig. 2A was initially adjusted to provide a signal on terminal 16 having a fifty percent duty cycle, each pulse appearing on terminal 23 originally was delayed by fifty percent of the time occurring between adjacent pulses applied to terminal 14. Following time T24, each pulse present on terminal 23 again is delayed by fifty percent of the new time elapsing between the pulses of W14 which occur at T21 and T24.

Referring more particularly to Fig. 5 wherein the waveforms present in the circuits of Figs. 2A and 2B are illustrated for a case where the speed of the drum is decreased from a first value to a second value. It will be shown that after the speed of rotation of the drum has decreased, the circuit of Fig. 2A adjusts the On time of the single-cycle multivibrator so as to restore the predetermined duty cycle of the signal present on terminal 16.

The positive pulses of W14 of Fig. 5 which occur during the interval T1—T9 are equally spaced. The example of Fig. 5 assumes that some time during the interval T9—T14, the speed of the drum increases such that five intervals of time elapse between each of the positive pulses of W14 after T9. The breaks in the waveforms of Fig. 5 indicate that a period of time is required for the speed of the drum to change. Assume that the single-cycle multivibrator is initially adjusted to have a fifty percent duty cycle so that the first three pulses of W14 of Fig. 5 which are equally spaced cause waveform W16 during this time to have a fifty percent duty cycle. Consequently, the average D.C. grid voltage applied to grids 80 and 90 of tubes 81 and 91 (Fig. 2A) are steady valued as indicated by W80 and W90 of Fig. 5. It is also apparent that during the interval T1—T11, the waveforms W19, W21 and W23 are each periodic.

The single-cycle multivibrator responds to the positive pulse of W14 at T9 time causing it to be On during T9—T11. Up until this time the On time of the multivibrator in response to a pulse on terminal 14 has not changed. The single-cycle multivibrator remains Off from T11 until T14, at which time a positive pulse is applied to terminal 14 (see W14 of Fig. 5). It is apparent from waveform W16 that the duty cycle thereof during T9—T14 has decreased from fifty percent to forty percent. Accordingly, the time average value of waveform W76 during T9—T14 has increased since this signal is Up for a longer period of time than it is Down. This increase in the time average value of W76 is indicated by the fact that the average D.C. value of W80 is slightly higher at T14 than it was at T9. Since the signal of W86 is Down a greater portion of the time than it is Up during T9—T14, the time average value thereof is decreased as indicated by waveform W90 at T14 time.

The positive pulse of W14 occurring at time T14 triggers the single-cycle multivibrator so that it is turned On. Since the previous signals present on terminal 16 have caused the D.C. control grid voltage of grid 90 to decrease by the same amount that the grid voltage of grid 80 is increased, tube 91 becomes less conductive whereupon the anode voltage thereof and thus the voltage on lead 61 is increased. The increased potential of lead 61 causes the grid voltage of tube 45 of the single-cycle multivibrator to be increased so that the next time it is turned On, it will remain On for a period slightly longer than was the case the previous time it was On. Thus when the positive pulse of W14 is applied to terminal 14 at time T14, the multivibrator is turned On and its On time is increased due to the increased voltage at the grid of tube 45. With respect to Fig. 5, it is noted that the waveform W16 is Up from T14 until approximately T16.2 time. At approximately T16.2 time, the signal on terminal 16 goes Down and remains Down until T19 when the multivibrator is again turned On by a pulse applied to terminal 14.

Since the potential at juncture 76 is Up for a greater period of time than it is Down during the time interval T14—T19 as indicated by W76 of Fig. 5, the interval of this waveform shown by W80 indicates that the grid voltage applied to grid 80 is again increased at time T19 over its value at time T14. Likewise, since W86 is Down a greater portion of the time than it is Up during the interval T14—T19, the time average value of this waveform is decreased. Thus the voltage applied to grid 90 becomes more negative as indicated by waveform W90.

The pulse on terminal 14 at time T19 causes the multivibrator to be turned On and it remains On until approximately T21.3 time. It will be noted that the On time of the multivibrator following time T19 is greater than the On time thereof following time T14. Since the waveform W16 between time T19 and T24 has not achieved a fifty percent duty cycle, the process described above whereby the grid voltage of tube 91 is adjusted and thus the control grid voltage of tube 45 is adjusted, is continued until such time as the rectangular wave on terminal 16 effectively achieves a fifty percent duty cycle. It will be noted that at time T24 the signals on grids 80 and 90 as represented by waveforms W80 and W90, respectively, have become stabilized. Accordingly, when the multivibrator is turned On at time T24 in response to a pulse applied to terminal 14, it will be On during T24—T26.5 time and will be Off during T26.5—T29 time. Waveforms W19, W21 and W23 are substantially in synchronism with waveform W14 after time T24 of Fig. 5.

The examples explained above with respect to Figs. 4 and 5 have indicated that when the speed of rotation of the drum 10 (Fig. 1) is increased or decreased as represented by an increase or decrease, respectively, of the pulse repetition frequency of the pulses applied to terminal 14, the circuit of Fig. 2A causes the pulses on terminals 16, 21 and 23 to be maintained in synchronism with the speed of the drum. It should be appreciated however, that the circuits of Figs. 2A and 2B can be used in other applications wherein it is desired to obtain pulses having a repetition rate twice the repetition rate of the pulses applied to terminal 14 or where it is desired that a train of pulses be produced where each pulse is delayed a given percentage of the time elapsing between adjustment pulses applied to terminal 14. While the examples of Figs. 4 and 5 have assumed an initial duty cycle of fifty percent, the duty cycle of the single-cycle multivibrator can be adjusted to other values as explained below.

With respect to Fig. 2A, it was stated that the purpose of potentiometer 69 is to adjust the duty cycle of the rectangular wave appearing on terminal 16 to a predetermined value. For example, it was stated that if a duty cycle of fifty percent is desired, potentiometer 69 is adjusted so that the amplitude of the waveform present at the anode of triode 67 is equal to the amplitude of the waveform present at the cathode of this tube. A general method whereby the amplitudes of the waveforms appearing on the anode and cathode of tube 67 can be adjusted so as to produce a desired duty cycle is described.

Referring more particularly to Fig. 6A, a single cycle of a rectangular waveform similar to that normally appearing at the anode of tube 67 (Fig. 2A) is illustrated. In Fig. 6A, time $t_a$ is the period during which the waveform is Down, time T is the period of one cycle, and X is the voltage amplitude of the rectangular wave. For simplicity, let A equal $$\frac{t_a}{T}$$

where A is the duty cycle of the waveform expressed as a percentage. The average D.C. value of the waveform of Fig. 6A equals XA. Referring to Fig. 6B, one cycle of the waveform normally present at the cathode of tube 67 (Fig. 2A) is illustrated where Y equals the voltage amplitude thereof. The average D.C. value of this waveform$=Y(1-A)$. If the average values of the waveforms of Figs. 6A and 6B are to be equal, it is apparent that $XA=Y(1-A)$.

Through the use of the last-mentioned formula, the relative amplitudes of the voltage waveforms necessary at the anode and cathode of tube 67 can be determined in order to obtain a desired duty cycle. For example, if a duty cycle of 33.3 percent is desired ($A=1/3$), it is apparent that potentiometer 69 of Fig. 2A must be adjusted so that the relative amplitude of the waveform present at the cathode of tube 67 is twice the amplitude of the waveform present at the anode of this tube. Accordingly, potentiometer 69 can be adjusted so that the rectangular waveform appearing on terminal 16 has a duty cycle of any predetermined value.

Referring more particularly to Fig. 7, another embodiment of the invention is illustrated where Figs. 7 and 2B are arranged as shown in Fig. 7A.

The portion of Fig. 7 which includes terminal 14, inverter 33, the single-cycle multivibrator, terminal 16 and phase inverter 67 is identical with the similar portion of Fig. 2A.

The anode of phase inverter 67 of Fig. 7 is connected through coupling capacitor 75 and resistor 136a in series to the control grid of inverter 135. The control grid of this tube is also connected to a negative bias supply through resistors 136a and 136, the cathode thereof is connected to ground and the anode is connected through resistor 137 to the +150 volt terminal 40. The anode of inverter 135 is connected through resistor 138 to the control grid of tube 139 where this grid is also connected through capacitor 140 to ground. Resistor 138 and capacitor 140 comprise an integrating network connected between the anode of tube 135 and the control grid of tube 139.

The cathode of phase inverter 67 is connected through the serial connection of capacitor 85 and resistor 146a to the control grid of tube 145 which is also connected to the negative bias supply through resistors 146a and 146. The cathode of inverter 145 is connected to ground and the anode thereof is connected through resistor 147 to the +150 volt terminal 40 and also through resistor 148 to the control grid of tube 149. Capacitor 150 is connected between the control grid of tube 149 and ground. Resistor 148 and capacitor 150 constitute an integration network connected between the anode of inverter 145 and the control grid of tube 149.

The pentode tubes 139 and 149 of Fig. 7 are connected as a differential amplifier wherein the cathodes thereof are connected together and through cathode resistor 152 to ground. The screen grids of pentodes 139 and 149 are connected together and through voltage dropping resistor 153 to the +300 volt terminal. The suppressor grids of these tubes are connected to their cathodes and the anode of tube 149 is connected to the +300 volt terminal, whereas the anode of tube 139 is connected through resistor 154 to the same terminal. The anode of pentode 139 is also connected by lead 61a to the right-hand terminal of switch 60.

When a series of pulses having a constant repetition frequency are applied to terminal 14 of Fig. 7, the waveform present on terminal 16 will be similar to W16 of Fig. 1A. The rectangular waveform on terminal 16 is applied to the control grid of phase inverter 67 so that a signal similar to that present on terminal 16 appears at the cathode while the signal present at the anode is the inversion of the signal on terminal 16. The voltage waveforms present on the anode and cathode of phase inverter 67 are respectively applied through capacitors 75 and 85 to the control grids 134 and 144 of inverters 135 and 145. The signals present on grids 134 and 144 are illustrated in Fig. 8A as waveforms W134 and W144, respectively.

Each of the triodes 135 and 145 is biased below the cut-off potentials thereof so that the respective tubes are non-conductive whenever the waveform at the proper control grid is Down causing the anode to rise to +150 volts. Whenever the waveform at the control grid of tube 135 or 145 is Up, the tube is driven sufficiently far into conduction that the anode potential thereof nearly always decreases to the same value as shown in Figs. 8A and 8B. Thus, the triodes 135 and 145 serve to clamp the waveforms appearing at their anodes at a reference level of +150 volts.

The waveform appearing at the anode of triode inverter 135 is applied to the integrating circuit composed of resistor 138 and capacitor 140. This integrating circuit integrates the waveform to determine its time average value. The D.C. potential at the output of the integrating circuit is applied to the control grid of tube 139. Similarly, the waveform appearing at the anode of triode inverter 145 is integrated and applied to the control grid of tube 149 by the integrating circuit which includes resistor 148 and capacitor 150.

Consider, for example, that the speed of rotation of the drum 10 (Fig. 1) is decreased to a given value such that the repetition rate of the pulses applied to terminal 14 of Fig. 7 is decreased. The waveforms illustrated in Fig. 8B represent such a condition where time T1 is taken as a time after which the drum has assumed its decreased speed of rotation. Here again it is noted that an instantaneous change in the speed of the drum cannot occur. The past history of the signals applied to the control grids of tubes 139 and 149 of Fig. 7 is assumed to be such that the control grid voltage of tube 45 is at a value that permits the single-cycle multivibrator to remain On during T1—T3 in response to a positive pulse applied to terminal 14 at time T1. The signal on terminal 16 goes Down at time T3 as shown by waveform W16 of Fig. 8B and remains Down until time T6, when a positive pulse is applied to terminal 14. This positive pulse again turns On the multivibrator which remains On until after time T8.

During the time interval T1—T3 of Fig. 8B, inverter 135 is rendered non-conductive so that the anode potential thereof is at +150 volts. During T3—T6, inverter 135 is rendered conductive such that the anode potential is Down (Fig. 8B). During the interval following time T6 when waveform W134 is Down, inverter 135 is non-conductive and its anode potential is +150 volts. At approximately time T8.2 when waveform W134 goes Up, the inverter is rendered conductive and the anode potential thereof goes Down. The alternation of the anode potential of inverter 135 continues as shown in Fig. 8B.

It will be noted with respect to the waveform shown in Fig. 8B which is present at the control grid of tube 139, that the average D.C. grid voltage progressively decreases and then increases during time T1—T16. At the same time, the D.C. grid voltage applied to the control grid of tube 149 progressively increases and then decreases. When the control grid voltage of tube 139 decreases the current conducted thereby decreases so that the anode voltage thereof and thus the potential applied via lead 61*a* to the control grid of tube 45 increases. Because of the fact that the control grid voltage of tube 45 increases, each time the multivibrator is turned On the On time will be slightly longer than during the immediately preceding cycle until such time as the On time becomes equal to the Off time. This of course assumes that potentiometer 69 of Fig. 7 is adjusted so that the duty cycle of the waveform present on terminal 16 is fifty percent as was assumed in the example shown in Fig. 8B.

The fifth waveform of Fig. 8B indicates that during T1—T3, inverter 145 is driven into conduction so that the anode potential thereof is Down. During the interval T6—T8.2, inverter 145 is again conductive. Also during T11—T13.4 and during T16—T18.5, the anode potential of inverter 145 is Down. It is now evident that the average D.C. voltage applied to the control grid of tube 149 progressively increases then decreases between T1—T16 of Fig. 8B. This signal causes tube 149 to tend to progressively increase and decrease the cathode bias developed across resistor 152. Thus, the voltage on lead 61*a* bears a relationship to the difference between the signals applied to the control grids of tubes 138 and 139.

The control grid voltages of pentodes 139 and 149 are stabilized at time T16 of Fig. 8B so that the duty cycle of the rectangular wave present on terminal 16 has been corrected so as to be equal to the predetermined value of fifty percent. While it has been indicated in Fig. 8B that the circuit of Fig. 7 required the time interval T1—T16 to correct the duty cycle of waveform W16 to its predetermined value, the time actually required for this correction is dependent upon the time constants of the integrating circuits which include resistor 138 and capacitor 140 and also resistor 148 and capacitor 150. The waveforms of Fig. 8B merely illustrate one type of correction that is performed by the circuit of Fig. 7.

Referring more particularly to Fig. 9, another embodiment of the compensating pulse generator (15 of Fig. 1) is illustrated which performs the same general functions as are accomplished by the circuit of Fig. 2A. Here again the portion of Fig. 9 which includes terminal 14, inverter 33, tubes 45 and 47, and terminal 16 is identical with a corresponding portion of Fig. 2A.

Terminal 16 of Fig. 9 is connected to ground through resistor 68, to the right-hand plate of capacitor 65, and also through current limiting resistor 66 to the control grid of cathode follower 160. The anode of triode 160 is connected to the +150 volt terminal 40 and the cathode is connected to the arm of potentiometer 161. The lower end of potentiometer 161 is connected through resistor 162 to the —100 volt terminal 34, and the junction 163 of potentiometer 161 and resistor 162 is commonly connected to the cathode of diode rectifier 164 and the anode of diode rectifier 165. The anode of diode 164 is connected to the upper plate of capacitor 168 and through resistor 169 to control grid 170 of pentode 171. The lower plate of capacitor 168 is connected to ground. Grid 170 is also connected through resistor 172 to ground and through resistor 173 to the lower plate of capacitor 174. The lower plate of capacitor 174 is also connected to the cathode of diode 165 and the upper plate of this capacitor is connected to ground. Capacitor 175 is connected in parallel with resistor 172.

The anode of pentode 171 is connected to the +150 volt terminal 40. The suppressor grid thereof is connected to its cathode which is connected to the cathode of pentode 178 and also through resistor 179 to the —100 volt terminal 34. Pentodes 171 and 178 are connected to operate as a conventional grounded grid amplifier. The suppressor grid of pentode 178 is connected to its cathode, the control grid thereof is connected to ground, and the anode is connected through resistor 180 to terminal 40. The anode of pentode 178 is also connected by lead 61 to the right-hand terminal of switch 60. The screen grids of pentodes 171 and 178 are connected together and through voltage dropping resistor 181 to the +150 volt terminal 40.

The rectangular waveform appearing on terminal 16 is applied to the control grid of cathode follower 160 so that a similar waveform appears at juncture 163.

Capacitor 65 and resistor 68 of Fig. 9 constitute a coupling circuit so that the waveform on terminal 16 swings around a reference level of 0 volt. As long as the On time and the Off time of the single-cycle multivibrator are equal, the positive and negative excursions of the waveform on terminal 16 about the zero reference level will be equal. However, when the On time and Off time of the signal on terminal 16 are not equal, the waveform thereon will shift with respect to the zero reference line.

Consider for example, that the Up and Down of the signal on terminal 16 are equal, i.e., the waveform has a fifty percent duty cycle. When the signal on juncture 163 is Up, the anode of diode 165 is rendered more positive than its cathode, so that capacitor 174 is charged to the peak positive value of the signal on juncture 163. Capacitor 175 then bears the polarity negative on top, positive on the bottom, as shown in Fig. 9. When the signal on juncture 163 is Up, diode 164 is rendered non-conductive since the cathode thereof is more positive than its anode.

However, when the rectangular waveform on juncture 163 is Down, the cathode of diode 164 is negative with respect to its anode so that current is conducted therethrough which charges capacitor 168 to the negative peak value of the signal of juncture 163. Capacitor 168 is charged so that the polarity thereof is negative on the top, positive on the bottom, as shown in Fig. 9. During this time diode 165 is non-conductive because its anode is negative with respect to its cathode.

Capacitor 174 tends to discharge through resistors 173 and 172 during the time that diode 165 is cut off. Likewise, capacitor 168 tends to discharge through resistors 172 and 169 when diode 164 is non-conductive. Capacitor 175 tends to charge to the voltage drop appearing across resistor 172. It is apparent that if the waveform appearing at juncture 163 is symmetrical (Up time equals Down time), the magnitudes of the voltages to which capacitors 174 and 168 are charged will be equal. In this case the current flowing through resistor 172 due to the discharge of capacitor 174 is equal and opposite to the current flowing therethrough due to the discharge of capacitor 168. In effect then, under these conditions control grid 170 of tube 171 is maintained at ground potential.

When the control grid 170 is at ground potential, pentode 171 is conductive so that a particular voltage drop occurs across resistor 179. The voltage drop across this resistor applies a bias potential to tube 178, so that the current flowing through this tube causes the anode potential thereof to be maintained at a certain value. This potential controls the D.C. grid voltage applied to triode 45. Let it be assumed in this example that potentiometers 55 and 161 of Fig. 9 are adjusted so that when the repetition rate of the positive pulses applied to terminal 14 is constant, the rectangular waveform appearing on terminal 16 has a fifty percent duty cycle.

In order to illustrate the manner by which the duty cycle of the signal appearing on terminal 16 of Fig. 9 is maintained at its predetermined value, consider that a series of positive pulses, such as W14 of Fig. 8B, are applied to terminal 14. Again, it will be assumed that prior to T1 time of Fig. 8B the pulses applied to terminal 14 were of a constant repetition frequency corresponding to a constant speed of rotation of drum 10 (Fig. 1), and that after time T1 the repetition frequency of the pulses applied to terminal 14 decreased to a constant value corresponding to a decrease in the speed of rotation of the drum. The waveforms of Fig. 8B are used to illustrate the operation of the circuit and are not intended to imply that an instantaneous change in the speed of the drum has occurred. Accordingly, the waveform illustrated in Fig. 8B as W16 will appear on terminal 16 of Fig. 9. The waveform present at juncture 163 will be similar to waveform W16 of Fig. 8B except that the reference line about which the signal swings will be determined by the adjustment of potentiometer 161. The operation of diodes 164 and 165 of Fig. 9 will be explained with respect to waveform W16 of Fig. 8B where it must be remembered that the reference line of this waveform which appears on juncture 163 is not necessarily zero volts.

During the time interval T1—T3, when the waveform on juncture 163 is Up (see W16 of Fig. 8B), diode 165 is rendered conductive so as to charge capacitor 174 to potential $V_{60}$. During time interval T3—T6 diode 165 is non-conductive and diode 164 is conductive whereupon capacitor 168 is charged to a negative potential $V_{61}$. It is apparent from waveform W16 of Fig. 8B that the absolute value of potential $V_{60}$ is greater than $V_{61}$. Therefore, when capacitors 174 and 168 tend to discharge the D.C. voltage at control grid 170 is positive with respect to ground. The increased voltage at control grid 170 causes tube 171 to conduct more current so that the voltage drop across resistor 179 increases. The increased voltage across this resistor applies a greater bias voltage between the grid and cathode of pentode 178 whereupon the conduction of current through this tube is decreased. As a result of the decreased current through tube 178, the anode potential thereof and thus the D.C. grid voltage applied to triode 45, are increased in a positive direction. Accordingly, the next time the single-cycle multivibrator is turned On, the On time thereof is increased.

The increased grid voltage applied to tube 45 requires that when the multivibrator is turned On by the next positive pulse applied to terminal 14, the On time of the multivibrator will be increased over its value during the previous time that it was on.

The waveform W16 of Fig. 8B has commenced to shift by time T6 about its reference line. Accordingly, during the interval following T6 when the waveform on juncture 163 of Fig. 9 is Up, capacitor 174 charges to potential $V_{62}$ which is less positive than $V_{60}$. When the waveform at juncture 163 is Down during the latter portion of the interval T6—T11, diode 164 is conductive to charge capacitor 168 to the negative potential $V_{63}$ (more negative than $V_{61}$).

As the process described above continues, waveform W16 shifts about its reference line until the positive and negative excursions thereof begin to approach equality. As this occurs the voltage across capacitor 175 approaches zero volts since the charges retained by capacitors 168 and 174 are nearly equal. However, the potential at grid 170 does not return to zero volts since the repetition frequency of the pulses applied to terminal 14 has changed from its initial value. The small D.C. voltage at grid 170 is effective to adjust the D.C. voltage applied to the control grid of tube 45 so that the predetermined duty cycle (fifty percent in example given) is re-established.

In the example given above where a duty cycle of fifty percent was selected, it is obvious that potentiometer 161 must be adjusted so that the reference level about which the voltage waveform on juncture 163 swings is zero volts. When a duty cycle other than fifty percent is desired, the reference level of the signal on juncture 163 is altered by adjusting potentiometer 161.

Referring in particular to Fig. 10, a further embodiment of the compensating pulse generator 15 of Fig. 1 is illustrated where Figs. 10 and 2B are arranged as indicated by Fig. 10A. The left-hand portion of Fig. 10 which includes the single-cycle multivibrator is identical with the same portion of Fig. 2A. It will be shown that the circuit of Fig. 10 performs the same functions as performed by the circuit of Fig. 2A.

In Fig. 10 the anode of triode 47 of the single-cycle multivibrator is connected through coupling capacitor 65 to output terminal 16. The anode of triode 47 is also connected through capacitor 190 in parallel with resistor 191 to the left-hand end of resistor 192. The right-hand end of resistor 192 is connected to ground through capacitor 193 and also through the grid current limiting resistor 194 to the control grid of pentode 195. The juncture 198 of capacitor 190 and resistor 192 is connected to the upper end of potentiometer 199, the center arm of which is connected to the −250 volt terminal 200. Resistor 191 and potentiometer 199 constitute a direct coupling between the anode of tube 47 and an integrating circuit which includes resistor 192 and capacitor 193. The suppressor grid of pentode 195 is connected to the cathode thereof and to the −100 volt terminal 34. The screen grid of this tube is connected to ground and its anode is connected to one end of potentiometer 201. The arm of the potentiometer is connected to the +150 volt terminal 40. The anode of pentode 195 is connected by lead 61 to the right-hand terminal of switch 60. Capacitor 190 which is in parallel with resistor 191 serves as a conventional frequency compensating capacitor in the direct coupling between the anode of triode 47 and the control grid of pentode 195.

Since the anode of triode 47 is directly coupled to pentode 195, the latter tube serves as a D.C. amplifier. The adjustment provided by potentiometer 199 permits the reference level of the voltage waveform applied to the integrating circuit to be adjusted so that the duty cycle of the rectangular waveform appearing on terminal 16 can be adjusted to any desired value. In other words, the adjustment of potentiometer 199 of Fig. 10 performs the same function as the adjustment of potentiometer 69 of Fig. 2A.

The integrating circuit consisting of resistor 192 and capacitor 193 of Fig. 10 determines the time average value of the rectangular waveform present at the anode of tube 47 so as to apply an average D.C. potential corresponding to said time average value to the control grid of pentode 195. Consider for example, that during several cycles of the rectangular waveform at the anode of tube 47, this signal is Down a greater portion of each cycle than it is Up. This situation occurs when the pulse repetition frequency of the positive pulses applied to terminal 14 of Fig. 10 is decreased. Let it further be assumed that potentiometer 199 is initially adjusted so that the signal on terminal 16 has a fifty percent duty cycle. Since the signal at juncture 198 is Down for a greater portion of each cycle than it is Up, the time average value thereof integrated over several cycles will progressively decrease in much the same manner as illustrated by waveform W90 of Fig. 5. Accordingly, the average D.C. voltage applied to the control grid of tube 195 (Fig. 10) progressively decreases so that this tube conducts less current. This causes the anode voltage of the pentode to progressively increase whereby the D.C. grid voltage applied to the control grid of tube 45 progressively increases which causes the On time of the multivibrator to be increased each time the multivibrator is turned On. This process continues until the grid voltage applied to tube 45 has risen to the point where the duty cycle of the rectangular waveform present at the anode of tube 47 is adjusted so as to re-establish the predetermined duty cycle.

When a signal on terminal 16 is Up a greater portion of a single cycle than it is Down, the time average value of this waveform will progressively increase thereby causing the potential at the anode of pentode 195 to progressively decrease. The decrease in the anode potential of tube 195 is applied over lead 61*b* to the control grid of triode 45 so that the On time of the multivibrator is progressively decreased until the predetermined duty cycle of the waveform at the anode of tube 47 is reestablished.

While the examples related above with respect to Fig. 10 have considered a duty cycle of fifty percent, it is apparent from the foregoing discussion that when potentiometer 199 is adjusted to provide a duty cycle of some other value, the circuit of Fig. 10 is operative to maintain the predetermined duty cycle.

While there have been shown and described and pointed out the fundamental novel features of the invention as applied to preferred embodiments, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A synchronized timing circuit including in combination, means including a moving storage medium having a variable velocity and from which is obtained a train of electrical timing pulses synchronized with the velocity of said moving storage medium, first means responsive to each timing pulse for producing a single cycle of a voltage waveform having a first portion, circuit means responsive to said voltage waveform to determine the time average value thereof, and means responsive to said time average value of said circuit means and coupled to said first means for automatically controlling the duration of said first portion of said voltage waveform as a predetermined portion of the duration of said single cycle, whereby the duration of said first portion is altered in response to variations in said velocity to thereby maintain the duration of said first portion as a predetermined portion of said single cycle.

2. A timing circuit including the combination of a source of electrical timing pulses having a variable repetition frequency, automatically controllable means responsive to each timing pulse to produce a voltage change upon the elapse of a predetermined portion of the time interval existing between adjacent timing pulses, means for adjusting said automatically controllable means to cause said voltage change to be produced upon the elapse of any chosen predetermined portion of said time interval, and means responsive to said voltage change to produce a marker pulse coincidentally therewith and time displaced with respect to each said timing pulse, whereby the relative position of each said marker pulse with respect to adjacent timing pulses is continuously maintained as variations in the repetition frequency of said timing pulses occur.

3. A timing circuit including a mechanically movable storage medium providing a train of electrical timing pulses, said pulses being synchronized with the velocity of the movable storage medium; a single cycle multivibrator having a settable duty cycle for generating a rectangular voltage waveform; means for applying said timing pulses to said multivibrator to effect the generation of said waveform; electrical circuit integrating means coupled to the output of said multivibrator for producing a control voltage derived from the integral of said voltage waveform; and means for applying said control voltage to said multivibrator for continuously maintaining the duty cycle thereof at said chosen predetermined value.

4. A timing circuit including the combination of, an electrical pulse source capable of emitting a train of timing pulses having a changeable repetition frequency, a single cycle multivibrator comprising a first tube and a second tube, means for applying said timing pulses to said first tube, continuously responsive means connected to said second tube and said first tube for controlling the operation of said first tube so that the duty cycle of the single cycle multivibrator will be maintained at any chosen predetermined value notwithstanding changes in the repetition frequency of said timing pulses, whereby the frequency of operation of said multivibrator is continuously adjusted to thereby maintain the duty cycle at a chosen value.

5. A timing circuit including the combination of a mechanical movable storage medium having a changeable velocity and providing a train of electrical timing pulses, said pulses being synchronized with the velocity of the movable storage medium; a single cycle multivibrator having a settable duty cycle for generating a generally rectangular voltage waveform having a first and a second segment; means for applying said timing pulses to said multivibrator to effect the generation of said voltage waveform; a biasing circuit connected to said multivibrator for establishing the ratio of the time duration of said first segment to said second segment of said rectangular voltage waveform; first means for continuously maintaining the ratio of said first segment to said second segment at a predetermined value comprising electronic circuit means responsive to said voltage waveform to determine the time average value of said waveform; and second means responsive to said time average value for applying a control voltage to said biasing circuit in order to cause the chosen ratio of said first and second segments to be continuously maintained irrespective of changes in the velocity of said movable storage medium.

6. A timing circuit including a mechanically movable storage medium providing a train of electrical timing pulses, said pulses being synchronized with the velocity of the movable storage medium; a single cycle multivibrator having a settable duty cycle for generating a rectangular voltage waveform; means for applying said timing pulses to said multivibrator to effect the generation of said waveform; means receiving said voltage waveform for adjusting the voltage reference level thereof with respect to ground potential whereby a chosen duty cycle value may be selected; first means responsive to said last-named means for producing a control signal equal to the time average value of a first portion of said waveform; second means coupled to said last-named means for producing a control signal derived from the time average value of a second portion of said waveform; comparing means responsive to said first means and said second means for producing a control voltage having a predetermined relationship to the change in velocity of said movable storage medium; and further circuit means for applying said control voltage to said multivibrator whereby the duty cycle thereof is maintained at said chosen predetermined value irrespective of changes in the velocity of said movable storage medium.

7. A timing circuit for use in conjunction with a magnetic drum computer wherein the angular velocity of the rotating drum is subject to variations including the combination of, first means for reading timing pulses from the rotating magnetic drum; circuit means for receiving said timing pulses for producing a train of clock pulses having a predetermined period and having a repetition frequency related to that of said timing pulses; means connected to said circuit means for initially adjusting the ratio of the period of said clock pulses to the period of said timing pulses to any chosen predetermined value; and electronic circuit means responsive to said circuit means for automatically maintaining said ratio at said chosen predetermined value irrespective of changes in the velocity of said rotating drum, whereby said clock pulses are maintained in synchronism with the velocity of said storage medium.

8. A timing circuit including the combination of, means for receiving a plurality of input pulses having a cycle time which inherently varies continuously over a wide range, means responsive to said input pulses to provide output pulses delayed a predetermined percentage of the cycle time of said input pulses, and means connected to control said last-mentioned means and responsive to the time delay of said output pulses to maintain the delay thereof equal to said predetermined percentage when said cycle time is varied, whereby said output pulses are maintained in time synchronism with said input pulses despite alterations in the repetition frequency of said input pulses.

9. A timing circuit including a combination of means for receiving a plurality of input pulses having a cycle time which is susceptible to variation, circuit means responsive to said input pulses to generate an electrical signal interposed at any chosen point between two adjacent input pulses, and electrical time averaging means receiving said electrical signal and connected to said circuit means for maintaining the relative position of said electrical signal between adjacent input pulses notwithstanding changes in said cycle time.

10. A timing circuit including the combination of, means for receiving a plurality of input pulses having a cycle time continuously subject to change, a single cycle multivibrator having a chosen duty cycle value adjustable to any of a range of values and comprising a normally conductive and a normally non-conductive tube for producing an output voltage waveform, first means for applying said input pulses to said multivibrator, second means connected to receive said waveform from said multivibrator and operable in response to said waveform to produce electrical representations of the time average value thereof, third means coupled to said second means and said multivibrator to convert said electrical representations to a control signal for continuously adjusting the duty cycle thereof to said chosen value whenever said cycle time is changed.

11. A timing circuit as claimed in claim 10 wherein said second means comprises cathode follower means coupled to the anode of said normally conductive tube for establishing a voltage reference having reoccurring successive positive and negative potential excursions with respect to a fixed reference potential, first and second capacitors, first unidirectional conductive means for charging said first capacitor to the average positive potential of said voltage waveform, and second unidirectional conductive means for charging said second capacitor to the average negative potential of said voltage waveform, whereby the relative amplitudes of the charges on said capacitors determine the magnitude of said control signal for continuously adjusting the duty cycle of said multivibrator to said chosen value whenever the cycle time of said input pulses is changed.

12. The timing circuit claimed in claim 10 wherein said second means includes, phase inverter means for receiving said voltage waveform and producing therefrom a first voltage signal and a second voltage signal of opposite phase to said first voltage signal, first circuit means coupled to said phase inverter means to produce a voltage representation of the time average value of said first voltage signal, second circuit means coupled to said phase inverter means to produce a voltage representation of the time average value of said second voltage signal, and differential amplifier means for receiving and comparing each of said voltage representations to produce said control signal having an amplitude related to the change occurring in said cycle time, whereby a change in said cycle time causes a change in said voltage waveform sufficient to re-establish said chosen duty cycle.

13. The timing circuit claimed in claim 12 wherein said first circuit means and said second circuit means each comprise a clamping circuit means respectively coupled to said phase inverting means for respectively accepting said first and second voltage signals, and electrical integrating circuit means coupled between each of said clamping circuit means and said differential amplifier means, whereby said first and second circuit means each produce electrical representations of said voltage waveform that is related to the change occurring in said cycle time and are compared within said differential amplifier to thereby produce said control signal.

14. The timing circuit claimed in claim 10 wherein said second means comprises a voltage dividing means coupled to said normally conductive tube to permit adjustment of the voltage reference level of said voltage waveform, and electrical integrating circuit means connected between said voltage dividing means and said third means for producing a voltage representation which varies in accordance with a change occurring in said cycle time, whereby said control signal is applied to said multivibrator to readjust the duty cycle thereof to said chosen value so that the duty cycle of said output voltage waveform remains substantially constant.

15. A timing circuit including the combination of means for receiving a plurality of input pulses having a cycle time which is capable of assuming a range of values, a monostable device having a chosen predetermined duty cycle value which is adjustable to any of a range of values and for producing an output voltage waveform, first means for applying said input pulses to said device, second means connected to receive said output voltage waveform for initially adjusting the voltage reference level thereof whereby the duty cycle of said device is adjusted to said chosen predetermined value, third means coupled to said second means for generating an electrical representation of the time average value of said output voltage waveform, and fourth means responsive to said electrical representations to produce a control signal bearing a relationship to the change in said cycle time to cause continuous readjustment of the duty cycle of said device to said chosen value whenever said cycle time undergoes a change.

16. A timing circuit including the combination of, a mechanically movable storage medium providing a train of electrical timing pulses, said pulses being synchronized with the velocity of the movable storage medium; a single cycle multivibrator having a settable duty cycle for generating a rectangular voltage waveform; means for applying said timing pulses to said multivibrator to effect the generation of said waveform; means responsive to said waveform for adjusting the voltage reference level thereof with respect to a fixed potential whereby a chosen duty cycle value may be selected; means responsive to said last-named means for generating a control voltage derived from the integral of said waveform; and means for applying said control voltage to said multivibrator to adjust the operation thereof whereby the duty cycle of said multivibrator is automatically maintained at said chosen value irrespective of alterations in the velocity of said movable storage medium.

17. A timing circuit including a mechanically movable storage medium providing a train of electrical timing pulses, said pulses being synchronized with the velocity of the movable storage medium; a single cycle multivibrator having a settable duty cycle for generating a rectangular voltage waveform; means for applying said timing pulses to said multivibrator to effect the generation of said waveform; electrical circuit integrating means coupled to the output of said multivibrator for producing a control voltage derived from the integral of said voltage waveform; means for applying said control voltage to said multivibrator for continuously maintaining the duty cycle thereof at said chosen predetermined value; and additional means connected to receive said multivibrator output voltage waveform for generating successive pulses at both the beginning and at the end of each duty cycle to thereby provide output pulses synchronized with the input pulses at double the frequency thereof.

References Cited in the file of this patent

UNITED STATES PATENTS

| | | |
|---|---|---|
| 2,358,448 | Earp | Sept. 19, 1944 |
| 2,408,078 | Labin et al. | Sept. 24, 1946 |
| 2,540,654 | Cohen | Feb. 6, 1951 |
| 2,541,378 | Nyquist | Feb. 13, 1951 |
| 2,678,387 | Volz | May 11, 1954 |
| 2,680,239 | Daniels et al. | June 1, 1954 |
| 2,721,989 | Gates | Oct. 25, 1955 |